US012647847B2

(12) United States Patent
Lopes

(10) Patent No.: US 12,647,847 B2
(45) Date of Patent: Jun. 2, 2026

(54) DETECTION OF REMOTE FEATURE SUPPORT

(71) Applicant: QUALCOMM Incorporated, San Diego, CA (US)

(72) Inventor: Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/189,548

(22) Filed: Mar. 24, 2023

(65) Prior Publication Data
US 2023/0337072 A1 Oct. 19, 2023

Related U.S. Application Data

(60) Provisional application No. 63/330,821, filed on Apr. 14, 2022.

(51) Int. Cl.
*H04W 36/00* (2009.01)

(52) U.S. Cl.
CPC ... *H04W 36/0061* (2013.01); *H04W 36/0079* (2018.08)

(58) Field of Classification Search
CPC ..................... H04W 36/0061; H04W 36/0079
See application file for complete search history.

(56) References Cited

U.S. PATENT DOCUMENTS

2020/0059989 A1* 2/2020 Velev .................... H04W 36/12
2020/0314701 A1* 10/2020 Talebi Fard .......... H04W 36/08
2024/0414600 A1* 12/2024 Lyazidi ............. H04W 36/0022

OTHER PUBLICATIONS

Ericsson: "UP IP: Update to Solution #21 (Interworking Handover from EPS to 5GS)", 3GPP TSG-SA3 Meeting #103-e, S3-212133, 3rd Generation Partnership Project, Mobile Competence Centre, 650, Route Des Lucioles, F-06921 Sophia-Antipolis Cedex, France, vol. SA WG3, No. E-meeting, May 17, 2021-2021052821, May 21, 2021, 6 Pages, XP052013384, Figure 6.21.3.1.1, Call Flow Description on 3rd Page.

(Continued)

*Primary Examiner* — Sulaiman Nooristany
(74) *Attorney, Agent, or Firm* — Holland & Hart LLP

(57) ABSTRACT
Methods, systems, and devices for wireless communications are described. A source network device may transmit a request to a target network device via a core network (e.g., one or more access and mobility management functions (AMFs)). The source network device includes an indication of information elements within a source-to-target transparent container configured for forwarding to the target network device by the core network. The source network device may receive a report from the target network device within a target-to-source transparent container, the report part of a response to the request. The report may indicate whether individual information elements are present in the request as received at the target network device or are supported by the target network device, where the source network device may identify presence of the information elements or support of the information elements by the target network device, an AMF, or both.

30 Claims, 19 Drawing Sheets

Transmit a first request from the source network device to a target network device via a core network — 1405

Include, within a source-to-target transparent container information element of the first request, an indication of one or more information elements associated with the first request, the source-to-target transparent container information element configured for forwarding to the target network device by one or more functions of the core network — 1410

Receive, from the target network device and via the core network, in association with a first response to the first request and within a target-to-source transparent container information element of the first response, a report indicative of whether individual information elements of the one or more information elements are present in the first request, as received at the target network device, or are supported by the target network device — 1415

1400

(56)     References Cited

OTHER PUBLICATIONS

Huawei, et al., "(TP to TS 38.413 BL CR) Mobility Between Supporting Nodes", 3GPP TSG-RAN WG3 Meeting #115-e, R3-222810, 3rd Generation Partnership Project, Mobile Competence Centre, 650, Route Des Lucioles, F-06921 Sophia-Antipolis Cedex, France, vol. RAN WG3, No. E-meeting, Feb. 21, 2022-Mar. 3, 2022, Mar. 3, 2022, 216 pages, XP052131840, Chapter 9.3.1.29, Chapter 9.3.1.30.

International Search Report and Written Opinion—PCT/US2023/064979—ISA/EPO—Jun. 29, 2023.

Qualcomm Incorporated, et al., "Further Discussion on RACS Capability Detection for S1 and NG Handover", 3GPP TSG-RAN WG3 Meeting#115-e, R3-221738, 3rd Generation Partnership Project, Mobile Competence Centre, 650, Route Des Lucioles, F-06921 Sophia-Antipolis Cedex, France, vol. RAN WG3, No. Feb. 21, 2022-Mar. 3, 2022, Feb. 10, 2022, XP052107310, 6 pages, 2.1 General 2.2 NGAP 2.3 XnAP.

Qualcomm Incorporated, et al., "On RACS Capability Detection for S1 and NG Handover", 3GPP TSG-RAN WG3 Meeting #112-e, R3-211625, 3rd Generation Partnership Project, Mobile Competence Centre, 650, Route Des Lucioles, F-06921 Sophia-Antipolis Cedex, France, vol. RAN WG3, No. May 17, 2021-May 28, 2021, May 6, 2021, 4 pages, XP052001371, 2.3 Signalling options: (C3), Table on 3rd page, Observations 2, 3.

Qualcomm Incorporated: "RACS Impacts in RAN3 Specifications", 3GPP TSG-RAN WG3 Meeting #107-e, R3-200287, 3rd Generation Partnership Project, Mobile Competence Centre, 650, Route Des Lucioles, F-06921 Sophia-Antipolis Cedex, France, vol. RAN WG3, No. Feb. 24, 2020-Feb. 28, 2020, Feb. 14, 2020, 6 Pages, XP051854021, Proposal 3.

* cited by examiner

1010

1020

1015

1005

1000

130    105    115

Network
Entity

Transceiver    Antenna 1310    1315

Communications
Manager

Memory

Code

1330

1325

1320

1340

Processor

1335

1305

1300

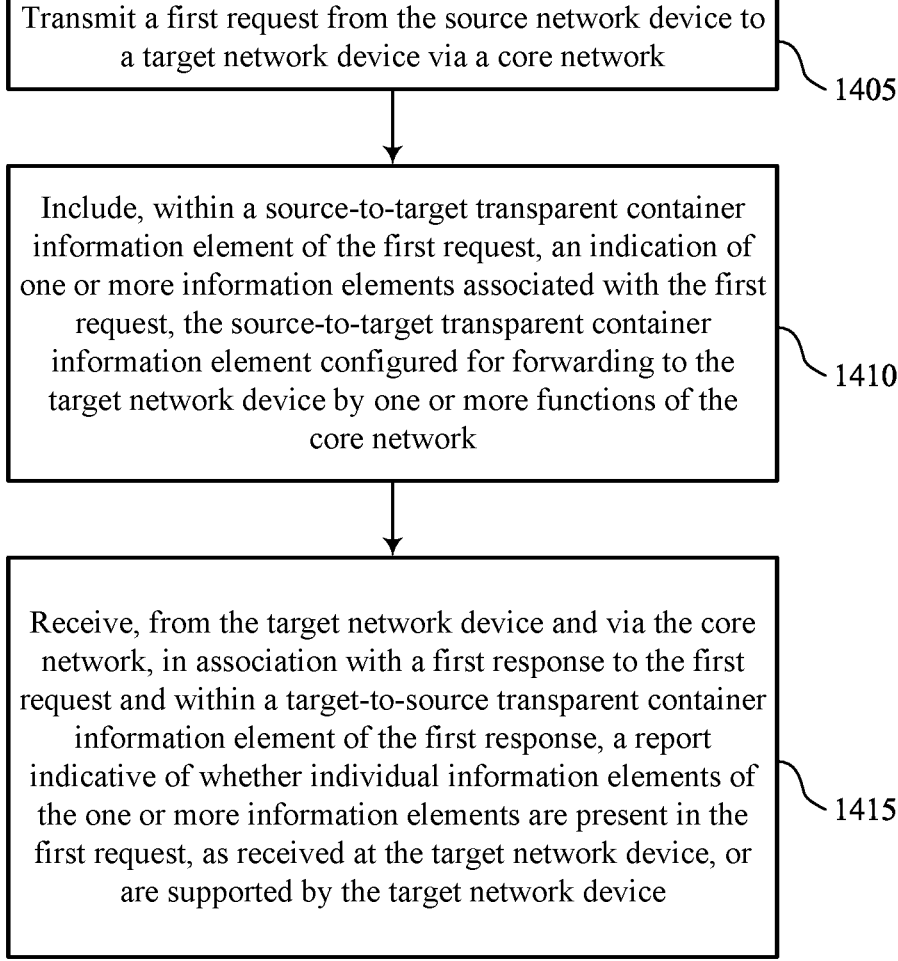

Transmit a first request from the source network device to a target network device via a core network
1405

Include, within a source-to-target transparent container information element of the first request, an indication of one or more information elements associated with the first request, the source-to-target transparent container information element configured for forwarding to the target network device by one or more functions of the core network
1410

Receive, from the target network device and via the core network, in association with a first response to the first request and within a target-to-source transparent container information element of the first response, a report indicative of whether individual information elements of the one or more information elements are present in the first request, as received at the target network device, or are supported by the target network device
1415

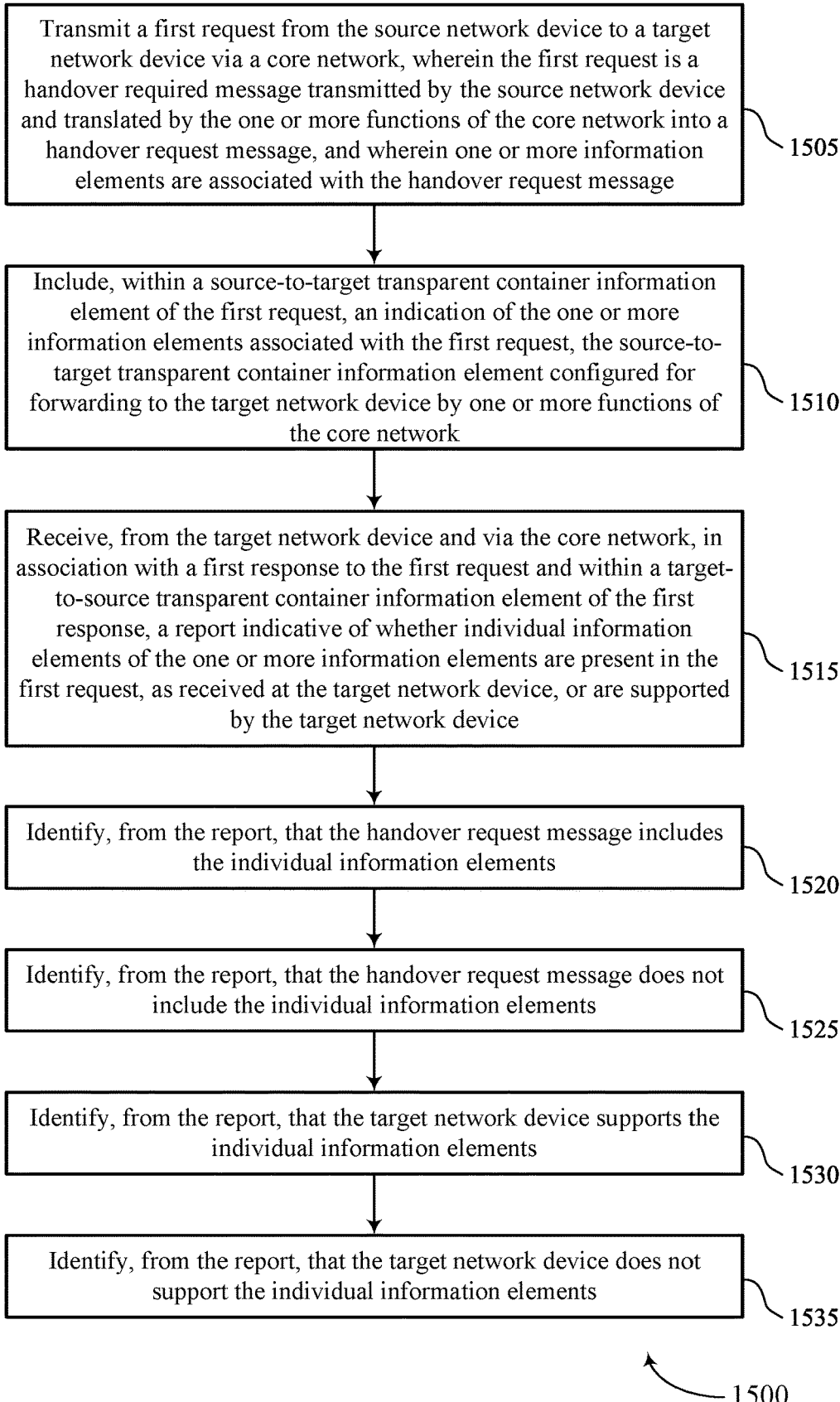

Transmit a first request from the source network device to a target network device via a core network, wherein the first request is a handover required message transmitted by the source network device and translated by the one or more functions of the core network into a handover request message, and wherein one or more information elements are associated with the handover request message

1505

Include, within a source-to-target transparent container information element of the first request, an indication of the one or more information elements associated with the first request, the source-to-target transparent container information element configured for forwarding to the target network device by one or more functions of the core network

1510

Receive, from the target network device and via the core network, in association with a first response to the first request and within a target-to-source transparent container information element of the first response, a report indicative of whether individual information elements of the one or more information elements are present in the first request, as received at the target network device, or are supported by the target network device

1515

Identify, from the report, that the handover request message includes the individual information elements

1520

Identify, from the report, that the handover request message does not include the individual information elements

1525

Identify, from the report, that the target network device supports the individual information elements

1530

Identify, from the report, that the target network device does not support the individual information elements

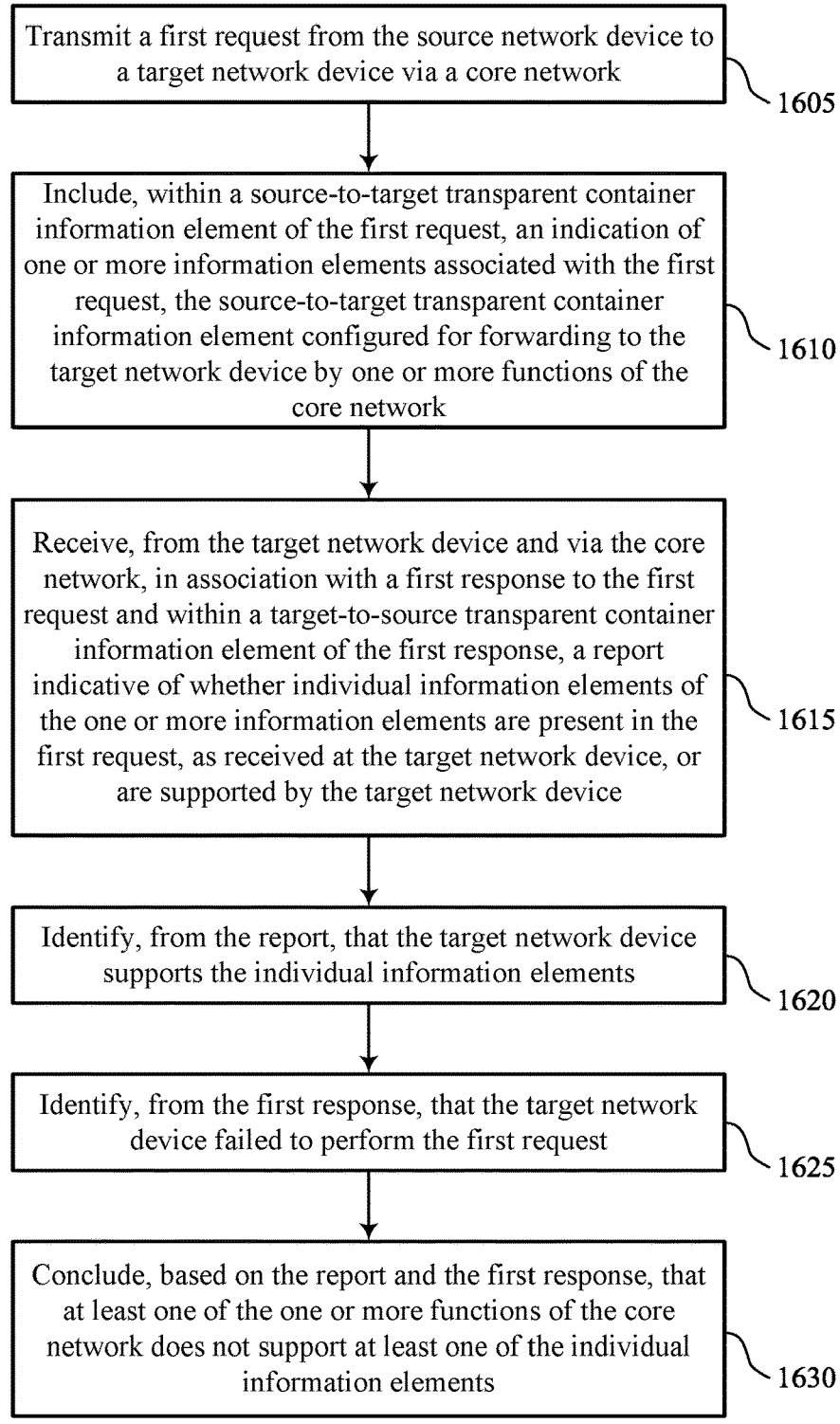

Transmit a first request from the source network device to a target network device via a core network
〜 1605

Include, within a source-to-target transparent container information element of the first request, an indication of one or more information elements associated with the first request, the source-to-target transparent container information element configured for forwarding to the target network device by one or more functions of the core network
〜 1610

Receive, from the target network device and via the core network, in association with a first response to the first request and within a target-to-source transparent container information element of the first response, a report indicative of whether individual information elements of the one or more information elements are present in the first request, as received at the target network device, or are supported by the target network device
〜 1615

Identify, from the report, that the target network device supports the individual information elements
〜 1620

Identify, from the first response, that the target network device failed to perform the first request
〜 1625

Conclude, based on the report and the first response, that at least one of the one or more functions of the core network does not support at least one of the individual information elements
〜 1630

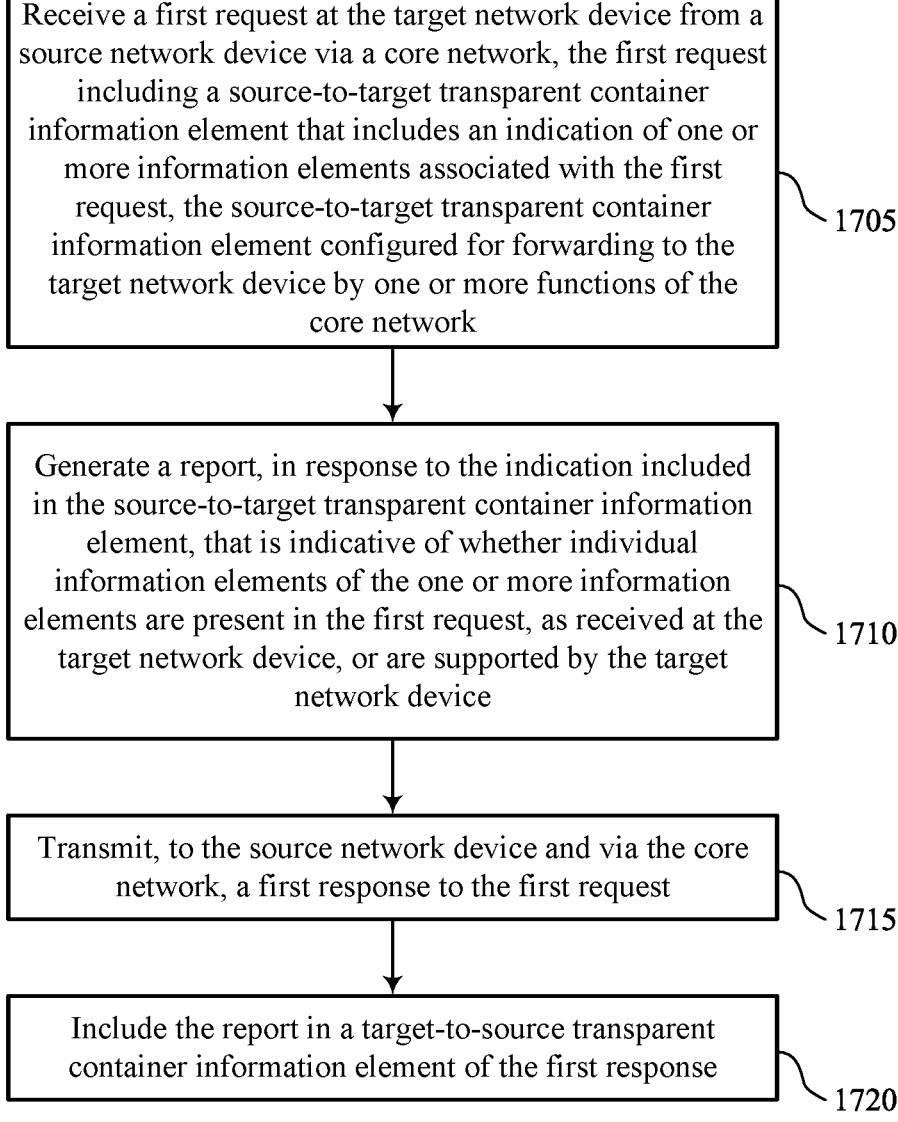

Receive a first request at the target network device from a source network device via a core network, the first request including a source-to-target transparent container information element that includes an indication of one or more information elements associated with the first request, the source-to-target transparent container information element configured for forwarding to the target network device by one or more functions of the core network ⟍ 1705

Generate a report, in response to the indication included in the source-to-target transparent container information element, that is indicative of whether individual information elements of the one or more information elements are present in the first request, as received at the target network device, or are supported by the target network device ⟍ 1710

Transmit, to the source network device and via the core network, a first response to the first request ⟍ 1715

Include the report in a target-to-source transparent container information element of the first response ⟍ 1720

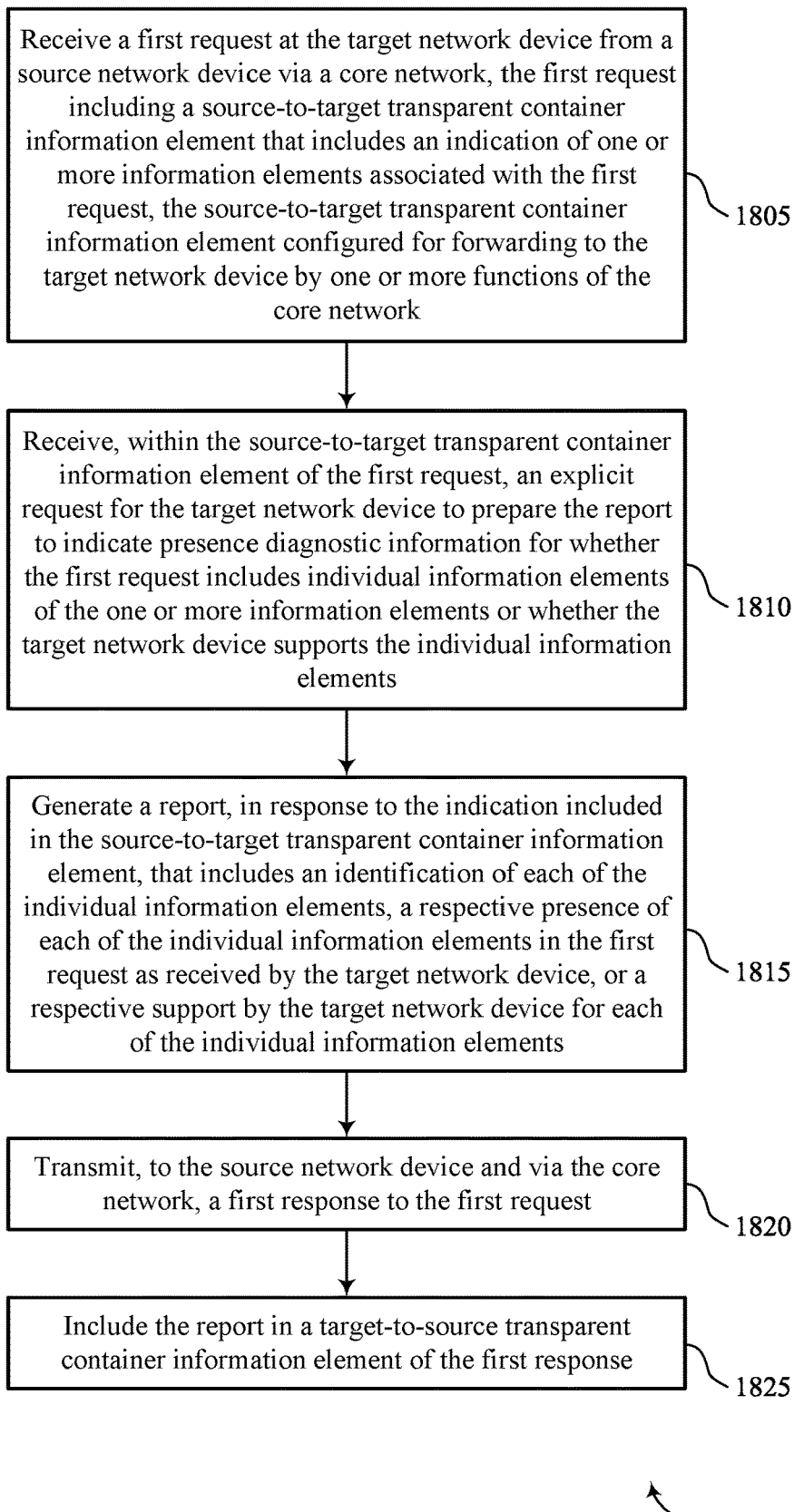

Receive a first request at the target network device from a source network device via a core network, the first request including a source-to-target transparent container information element that includes an indication of one or more information elements associated with the first request, the source-to-target transparent container information element configured for forwarding to the target network device by one or more functions of the core network

1805

Receive, within the source-to-target transparent container information element of the first request, an explicit request for the target network device to prepare the report to indicate presence diagnostic information for whether the first request includes individual information elements of the one or more information elements or whether the target network device supports the individual information elements

1810

Generate a report, in response to the indication included in the source-to-target transparent container information element, that includes an identification of each of the individual information elements, a respective presence of each of the individual information elements in the first request as received by the target network device, or a respective support by the target network device for each of the individual information elements

1815

Transmit, to the source network device and via the core network, a first response to the first request

1820

Include the report in a target-to-source transparent container information element of the first response

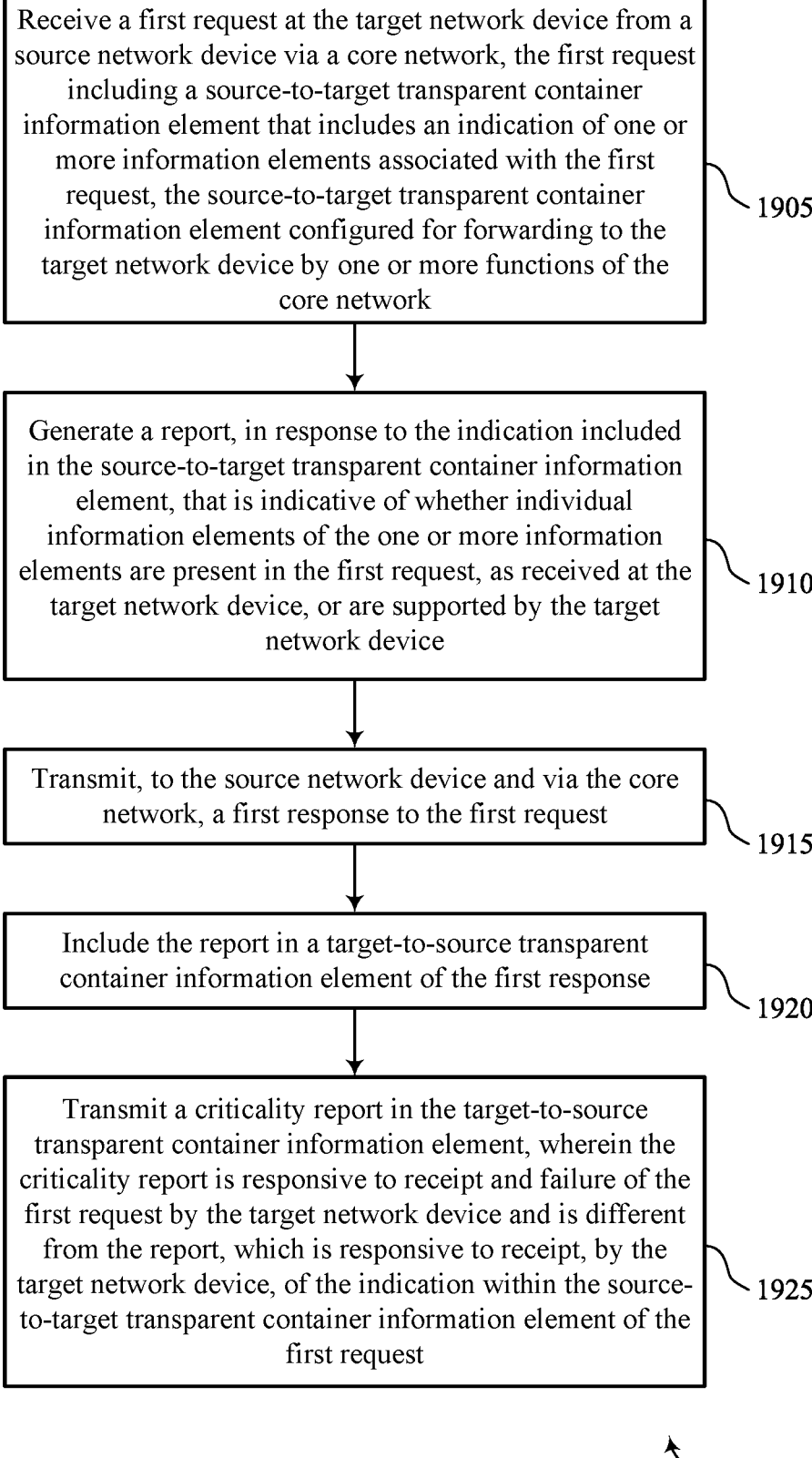

Receive a first request at the target network device from a source network device via a core network, the first request including a source-to-target transparent container information element that includes an indication of one or more information elements associated with the first request, the source-to-target transparent container information element configured for forwarding to the target network device by one or more functions of the core network

1905

Generate a report, in response to the indication included in the source-to-target transparent container information element, that is indicative of whether individual information elements of the one or more information elements are present in the first request, as received at the target network device, or are supported by the target network device

1910

Transmit, to the source network device and via the core network, a first response to the first request

1915

Include the report in a target-to-source transparent container information element of the first response

1920

Transmit a criticality report in the target-to-source transparent container information element, wherein the criticality report is responsive to receipt and failure of the first request by the target network device and is different from the report, which is responsive to receipt, by the target network device, of the indication within the source-to-target transparent container information element of the first request

DETECTION OF REMOTE FEATURE SUPPORT

CROSS REFERENCE

The present application for patent claims the benefit of U.S. Provisional Patent Application No. 63/330,821 by LOPES, entitled "DETECTION OF REMOTE FEATURE SUPPORT," filed Apr. 14, 2022, assigned to the assignee hereof, and expressly incorporated by reference herein.

FIELD OF TECHNOLOGY

The following relates to wireless communications, including detection, by a first network entity, of remote feature support by a second network entity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support feature support detection between network devices (e.g., network entities), for example, through implicit signaling. In some cases, however, such feature support detection may fail if the network devices lack a direct control plane interface between them.

SUMMARY

The described techniques relate to improved methods, systems, devices, and apparatuses that support detection, by a first network entity, of remote feature support by a second network entity. For example, the described techniques provide for remote feature support detection when a source network device and a target network device lack a direct connection, for example, in cases where the source and target network devices (e.g., network entities, base stations) communicate via a core network (e.g., a source access and mobility management function (AMF) and a target AMF). In some examples, the source network device may transmit a request message (e.g., a handover request message) to the target network device via the core network. The request may include a source-to-target transparent container information element that indicates one or more information elements included in the request.

Because the source-to-target transparent container information element is configured for forwarding (intended to be forwarded) to the target network device without any interference by the core network, the target network device may receive the source-to-target transparent container information element and subsequently, may generate a report indicating which information elements included in the request the target network device supports. The target network device may generate the report based on receiving the source-to-target transparent container information element, or the source-to-target transparent container information element may include a request to generate the report. In some cases, the target network device may provide the report to the source network device via a target-to-source transparent container information element associated with a response message (e.g., a handover response message). The source network device may use the report, in combination with the response message, to determine which information elements are supported by the target network device, the target AMF, or both, which may enable the source network device to perform more efficient communications with the target network device.

A method for wireless communication at a source network device is described. The method may include transmitting a first request from the source network device to a target network device via a core network, including, within a source-to-target transparent container information element of the first request, an indication of one or more information elements, the source-to-target transparent container information element configured for forwarding to the target network device, and receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

An apparatus for wireless communication at a source network device is described. The apparatus may include a processor, memory coupled with the processor, and instructions stored in the memory. The instructions may be executable by the processor to cause the apparatus to transmit a first request from the source network device to a target network device via a core network, include, within a source-to-target transparent container information element of the first request, an indication of one or more information elements, the source-to-target transparent container information element configured for forwarding to the target network device, and receive, from the target network device and via the core network, in association with a first response to the first request and within a target-to-source transparent container information element of the first response, a report indicative of whether individual information elements of the one or more information elements are present in the first request, as received at the target network device, or are supported by the target network device.

Another apparatus for wireless communication at a source network device is described. The apparatus may include means for transmitting a first request from the source network device to a target network device via a core network, means for including, within a source-to-target transparent container information element of the first request, an indication of one or more information elements, the source-to-target transparent container information element configured for forwarding to the target network device, and means for receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

A non-transitory computer-readable medium storing code for wireless communication at a source network device is described. The code may include instructions executable by a processor to transmit a first request from the source network device to a target network device via a core network, include, within a source-to-target transparent container information element of the first request, an indication of one or more information elements, the source-to-target transparent container information element configured for forwarding to the target network device, and receive, from the target network device and via the core network, in association with a first response to the first request and within a target-to-source transparent container information element of the first response, a report indicative of whether individual information elements of the one or more information elements are present in the first request, as received at the target network device, or are supported by the target network device.

In some examples of the method, apparatuses, and non-transitory computer-readable medium described herein, the first request may be a handover required message transmitted by the source network device and translated into a handover request message, and where the one or more information elements may be associated with the handover request message.

Some examples of the method, apparatuses, and non-transitory computer-readable medium described herein may further include operations, features, means, or instructions for identifying, from the report, that the handover request message includes the individual information elements.

Some examples of the method, apparatuses, and non-transitory computer-readable medium described herein may further include operations, features, means, or instructions for identifying, from the report, that the handover request message does not include the individual information elements.

Some examples of the method, apparatuses, and non-transitory computer-readable medium described herein may further include operations, features, means, or instructions for identifying, from the report, that the target network device supports the individual information elements.

Some examples of the method, apparatuses, and non-transitory computer-readable medium described herein may further include operations, features, means, or instructions for identifying, from the report, that the target network device does not support the individual information elements.

Some examples of the method, apparatuses, and non-transitory computer-readable medium described herein may further include operations, features, means, or instructions for identifying, from a combination of the report and the first response, whether the one or more functions of the core network support the individual information elements.

In some examples of the method, apparatuses, and non-transitory computer-readable medium described herein, identifying whether the one or more functions of the core network support the individual information elements may include operations, features, means, or instructions for identifying, from the report, that the target network device supports the individual information elements, identifying, from the first response, that the target network device failed to perform the first request, and concluding, based on the report and the first response, that at least one of the one or more functions of the core network does not support at least one of the individual information elements.

Some examples of the method, apparatuses, and non-transitory computer-readable medium described herein may further include operations, features, means, or instructions for including, within the source-to-target transparent container information element of the first request, an explicit request for the target network device to prepare the report to indicate presence diagnostic information for whether the first request includes individual information elements of the one or more information elements or whether the target network device supports the individual information elements.

In some examples of the method, apparatuses, and non-transitory computer-readable medium described herein, including the explicit request within the source-to-target transparent container information element may include operations, features, means, or instructions for identifying, in the explicit request, a specific information element of the one or more information elements for which presence diagnostic information may be requested, the specific information element indicated by a respective information element identifier or range of information element identifiers.

In some examples of the method, apparatuses, and non-transitory computer-readable medium described herein, the report includes an identification of each of the individual information elements, a respective presence of each of the individual information elements in the first request as received by the target network device, or a respective support by the target network device for each of the individual information elements.

Some examples of the method, apparatuses, and non-transitory computer-readable medium described herein may further include operations, features, means, or instructions for receiving a criticality report in the target-to-source transparent container information element, where the criticality report may be responsive to receipt and failure of the first request by the target network device and may be different from the report, which may be responsive to receipt, by the target network device, of the indication within the source-to-target transparent container information element of the first request.

In some examples of the method, apparatuses, and non-transitory computer-readable medium described herein, the criticality report indicates one or more critical information elements that may be unsupported by the target network device, the one or more critical information elements included in the criticality report based on a level of criticality of each of the one or more information elements.

In some examples of the method, apparatuses, and non-transitory computer-readable medium described herein, the level of criticality for inclusion of the one or more critical information elements in the criticality report includes a reject level of criticality.

In some examples of the method, apparatuses, and non-transitory computer-readable medium described herein, including the indication of the one or more information elements within the source-to-target transparent container information element of the first request may include operations, features, means, or instructions for indicating the one or more information elements via one or more criticality levels corresponding to the one or more information elements, where the report indicates the individual information elements and that correspond to the one or more criticality levels.

In some examples of the method, apparatuses, and non-transitory computer-readable medium described herein, the one or more criticality levels include a first level that corresponds to a criticality diagnostics report and may be indicative of whether the criticality diagnostics report is to be provided to the source network device, a second level that corresponds to a reject criticality and may be indicative that the report may be to indicate information elements having the reject criticality in the first request or support for the information elements having the reject criticality, and a third level that corresponds to an ignore criticality and may be indicative that the report may be to indicate support by the target network device for information elements having the ignore criticality.

A method for wireless communication at a target network device is described. The method may include receiving a first request at the target network device from a source network device via a core network, the first request including a source-to-target transparent container information element that includes an indication of one or more information elements, the source-to-target transparent container information element configured for forwarding to the target network device, generating a report, in response to the indication included in the source-to-target transparent container information element, that is indicative of whether individual information elements of the one or more information elements are present in the first request, as received at the target network device, or are supported by the target network device, transmitting, to the source network device and via the core network, a first response to the first request, and including the report in a target-to-source transparent container information element of the first response.

An apparatus for wireless communication at a target network device is described. The apparatus may include a processor, memory coupled with the processor, and instructions stored in the memory. The instructions may be executable by the processor to cause the apparatus to receive a first request at the target network device from a source network device via a core network, the first request including a source-to-target transparent container information element that includes an indication of one or more information elements, the source-to-target transparent container information element configured for forwarding to the target network device, generate a report, in response to the indication included in the source-to-target transparent container information element, that is indicative of whether individual information elements of the one or more information elements are present in the first request, as received at the target network device, or are supported by the target network device, transmit, to the source network device and via the core network, a first response to the first request, and include the report in a target-to-source transparent container information element of the first response.

Another apparatus for wireless communication at a target network device is described. The apparatus may include means for receiving a first request at the target network device from a source network device via a core network, the first request including a source-to-target transparent container information element that includes an indication of one or more information elements, the source-to-target transparent container information element configured for forwarding to the target network device, means for generating a report, in response to the indication included in the source-to-target transparent container information element, that is indicative of whether individual information elements of the one or more information elements are present in the first request, as received at the target network device, or are supported by the target network device, means for transmitting, to the source network device and via the core network, a first response to the first request, and means for including the report in a target-to-source transparent container information element of the first response.

A non-transitory computer-readable medium storing code for wireless communication at a target network device is described. The code may include instructions executable by a processor to receive a first request at the target network device from a source network device via a core network, the first request including a source-to-target transparent container information element that includes an indication of one or more information elements, the source-to-target transparent container information element configured for forwarding to the target network device, generate a report, in response to the indication included in the source-to-target transparent container information element, that is indicative of whether individual information elements of the one or more information elements are present in the first request, as received at the target network device, or are supported by the target network device, transmit, to the source network device and via the core network, a first response to the first request, and include the report in a target-to-source transparent container information element of the first response.

In some examples of the method, apparatuses, and non-transitory computer-readable medium described herein, the first request may be a handover required message transmitted by the source network device and translated into a handover request message, and where the one or more information elements may be associated with the handover request message.

Some examples of the method, apparatuses, and non-transitory computer-readable medium described herein may further include operations, features, means, or instructions for receiving, within the source-to-target transparent container information element of the first request, an explicit request for the target network device to prepare the report to indicate presence diagnostic information for whether the first request includes individual information elements of the one or more information elements or whether the target network device supports the individual information elements.

In some examples of the method, apparatuses, and non-transitory computer-readable medium described herein, receiving the explicit request within the source-to-target transparent container information element may include operations, features, means, or instructions for receiving, in the explicit request, a specific information element of the one or more information elements for which presence diagnostic information may be requested, the specific information element indicated by a respective information element identifier or range of information element identifiers.

In some examples of the method, apparatuses, and non-transitory computer-readable medium described herein, the report includes an identification of each of the individual information elements, a respective presence of each of the individual information elements in the first request as received by the target network device, or a respective support by the target network device for each of the individual information elements.

Some examples of the method, apparatuses, and non-transitory computer-readable medium described herein may further include operations, features, means, or instructions for transmitting a criticality report in the target-to-source transparent container information element, where the criticality report may be responsive to receipt and failure of the first request by the target network device and may be different from the report, which may be responsive to receipt, by the target network device, of the indication within the source-to-target transparent container information element of the first request.

In some examples of the method, apparatuses, and non-transitory computer-readable medium described herein, the criticality report indicates one or more critical information elements that may be unsupported by the target network device, the one or more critical information elements included in the criticality report based on a level of criticality of each of the one or more information elements.

In some examples of the method, apparatuses, and non-transitory computer-readable medium described herein, the level of criticality for inclusion of the one or more critical information elements in the criticality report includes a reject level of criticality.

In some examples of the method, apparatuses, and non-transitory computer-readable medium described herein, receiving the first request may include operations, features, means, or instructions for receiving, in the first request, the one or more information elements via one or more criticality levels corresponding to the one or more information elements, where the report indicates the individual information elements and that correspond to the one or more criticality levels.

In some examples of the method, apparatuses, and non-transitory computer-readable medium described herein, the one or more criticality levels include a first level that corresponds to a criticality diagnostics report and may be indicative of whether the criticality diagnostics report is to be provided to the source network device, a second level that corresponds to a reject criticality and may be indicative that the report may be to indicate information elements having the reject criticality in the first request or support for the information elements having the reject criticality, and a third level that corresponds to an ignore criticality and may be indicative that the report may be to indicate support by the target network device for information elements having the ignore criticality.

BRIEF DESCRIPTION OF THE DRAWINGS

FIGS. 14 through 19 show flowcharts illustrating methods that support detection of remote feature support in accordance with one or more aspects of the present disclosure.

DETAILED DESCRIPTION

Figure 1:
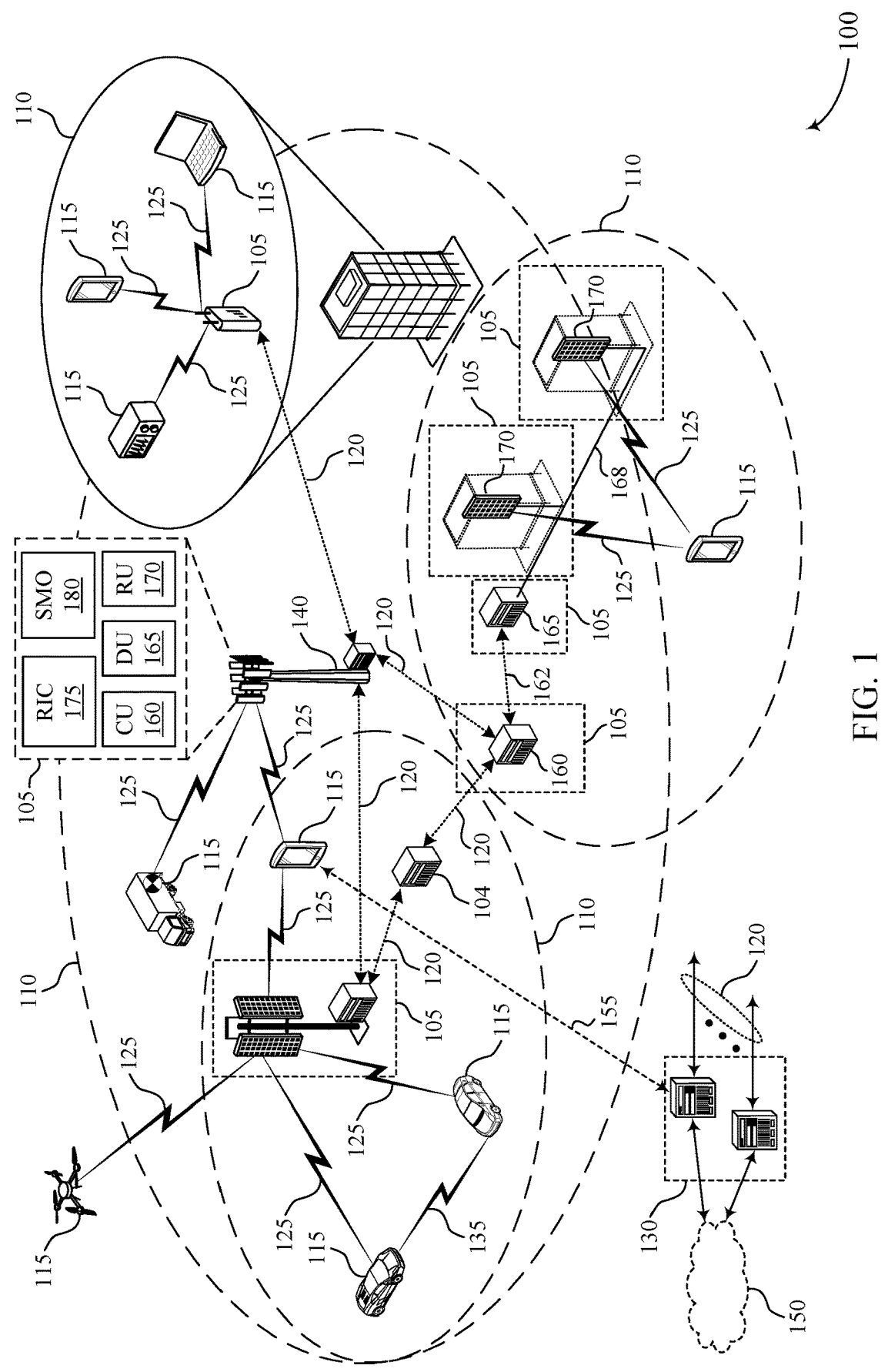
FIG. 1 illustrates an example of a wireless communications system that supports detection of remote feature support in accordance with one or more aspects of the present disclosure.

In some examples, multiple network devices (e.g., network entities, base stations) in a wireless communications system may lack support of the same features. The network devices may use implicit signaling to determine which features are supported. For example, a source network device may transmit a handover request to a target network device. If the handover request includes an information element (e.g., a user equipment (UE) identifier or an indication of a required functionality) that is unsupported by the target network device, and if the information element is a critical information element that may be supported (e.g., understood) if the target network device is to perform the request, then the target network device may reject the request and respond with a failure indication. As such, the source network device may understand that at least one critical-level information element corresponding to the handover request lacks support from the target network device. In some cases, if the source network device requests additional information element-level support information, the target network device may provide a criticality report (e.g., criticality diagnostics) that indicates, when the handover request fails, which information elements may have led to the failure.

However, if the source and target network devices lack direct communications with each other (e.g., if the communication between the network devices is via a core network, which may include one or more access and mobility management functions (AMFs)), the target network device may fail to provide the criticality report to the source network device. For example, if a target AMF associated with the target network device suspects that the target network device lacks support for a specific information element, the target AMF may refrain from forwarding the information element to the target network device as part of the handover request.

Accordingly, the handover request may fail, and the target network device may generate a criticality report without the unsupported information element as the target AMF failed to forward the unsupported information element to the target network device. Alternatively, if the target AMF lacks support for a particular information element in the handover request, the target AMF may exclude the particular information element from the handover request configured for forwarding to the target network device. As such, in cases where the criticality report returned to the source network device by the target network device lacks support information about a specific information element, the source network device may be left unaware of whether the failure occurred due to a lack of support at the target AMF, the target network device, or both, which may reduce the quality of communications at the source network device.

The techniques described herein support remote feature detection when a source network device and a target network device lack a direct connection, for example, in cases where the source and target network devices (e.g., network entities, base stations) communicate via a core network (e.g., a source AMF and a target AMF). In some examples, the source network device may transmit a request message (e.g., a handover request message) to the target network device via the core network. For example, the source network device may transmit a handover requirement message to the core network, where the source AMF, the target AMF, or both may translate the handover requirement message into a handover request message for transmission to the target network device. In some examples, the request may include a source-to-target transparent container information element that may include an indication of one or more information elements included in the request.

Because the source-to-target transparent container information element is configured for forwarding (intended to be forwarded) to the target network device without any interference by the core network, the target network device may receive the source-to-target transparent container information element and subsequently, may generate a report indicating which information elements included in the request the target network device supports. In some examples, the target network device may generate the report based on receiving the source-to-target transparent container information element, or the source-to-target transparent container information element may include a request to generate the report. The target network device may provide the report to the source network device via a target-to-source transparent container information element associated with a response message (e.g., a handover response message). The source network device may use the report, in combination with the response message, to determine which information elements are supported by the target network device, the target AMF, or both, which may enable the source network device to perform more efficient communications with the target network device.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to detection of remote feature support.

FIG. 1 illustrates an example of a wireless communications system 100 that supports detection of remote feature support in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125

(e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170).

In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support detection of remote feature support as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support remote feature detection when a source network device and a target network device lack a direct connection, for example, in cases where the source and target network devices (e.g., network entities 105, base stations 140) communicate via a core network 130 (e.g., a source AMF and a target AMF). In some examples, the source network device may transmit a request message (e.g., a handover request message) to the target network device via the core network 130. The request may include a source-to-target transparent container information element that indicates one or more information elements included in the request.

Because the source-to-target transparent container information element is configured for forwarding (intended to be forwarded) to the target network device without any interference by the core network 130, the target network device may receive the source-to-target transparent container information element and subsequently, may generate a report indicating which information elements included in the request the target network device supports. In some examples, the target network device may generate the report based on receiving the source-to-target transparent container information element, or the source-to-target transparent container information element may include a request to generate the report. The target network device may provide the report to the source network device via a target-to-source transparent container information element associated with a response message (e.g., a handover response message). The source network device may use the report, in combination with the response message, to determine which information elements are supported by the target network device, the target AMF, or both.

Figure 2:
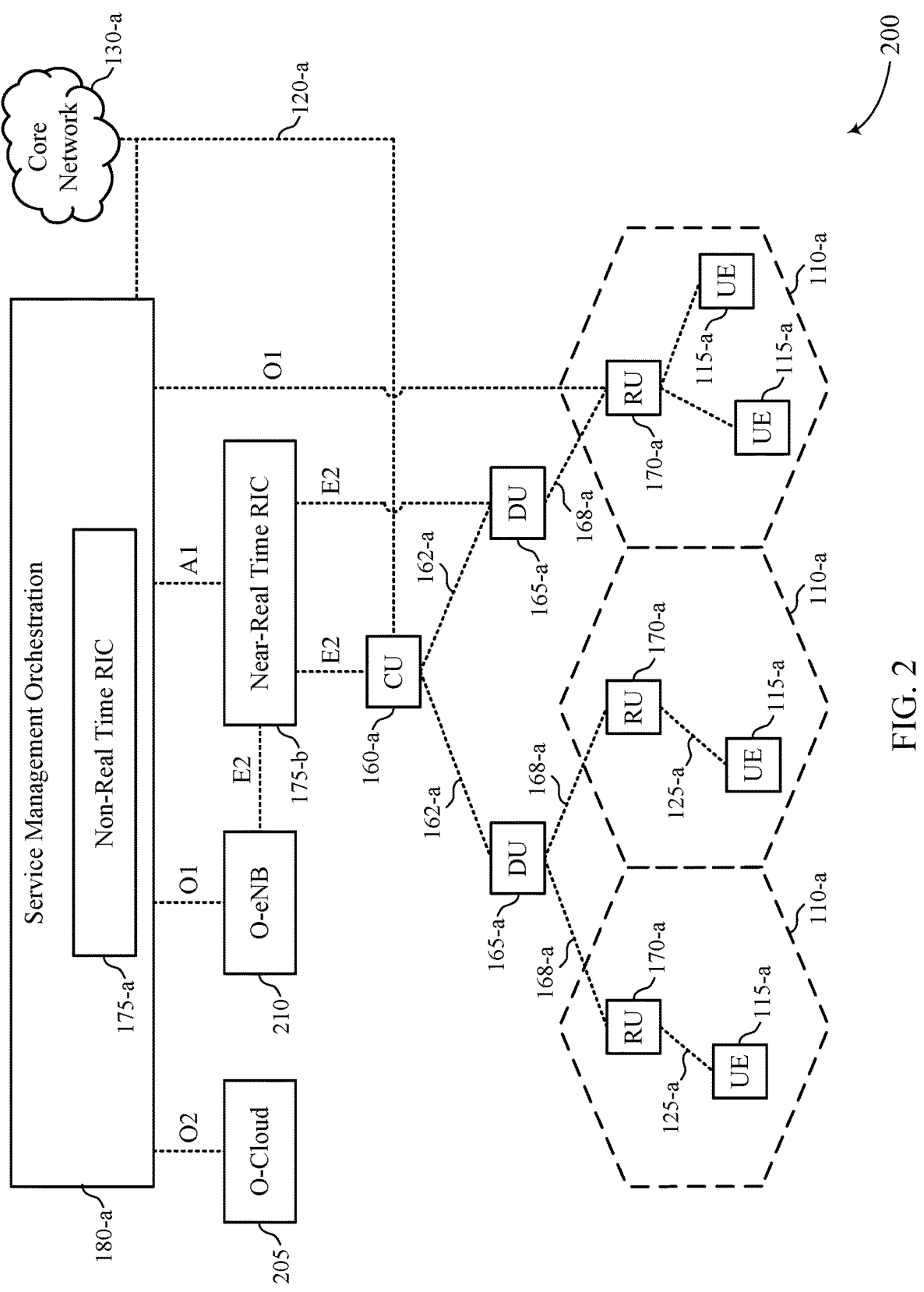
FIG. 2 illustrates an example of a network architecture that supports detection of remote feature support in accordance with one or more aspects of the present disclosure.

FIG. 2 illustrates an example of a network architecture 200 that (e.g., a disaggregated base station architecture, a disaggregated RAN architecture) that supports detection of remote feature support in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support remote feature detection when a source network device and a target network device lack a direct connection, for example, in cases where the source and target network devices (e.g., network entities 105, base stations 140) communicate via a core network 130-*a* (e.g., a source AMF and a target AMF). In some examples, the source network device may transmit a request message (e.g., a handover request message) to the target network device via the core network 130-*a*. The request may include a source-to-target transparent container information element that may include an indication of one or more information elements included in the request. Because the source-to-target transparent container information element is intended for forwarding to the target network device without any interference by the core network 130-*a*, the target network device may receive the source-to-target transparent container information element and subsequently, may generate a report indicating which information elements included in the request the target network device supports. In some examples, the target network device may generate the report based on receiving the source-to-target transparent container information element, or the source-to-target transparent container information element may include a request to generate the report. The target network device may provide the report to the source network device via a target-to-source transparent container information element associated with a response message (e.g., a handover response message). The source network device may use the report, in combination with the response message, to determine which information elements are supported by the target network device, the target AMF, or both.

Figure 3:
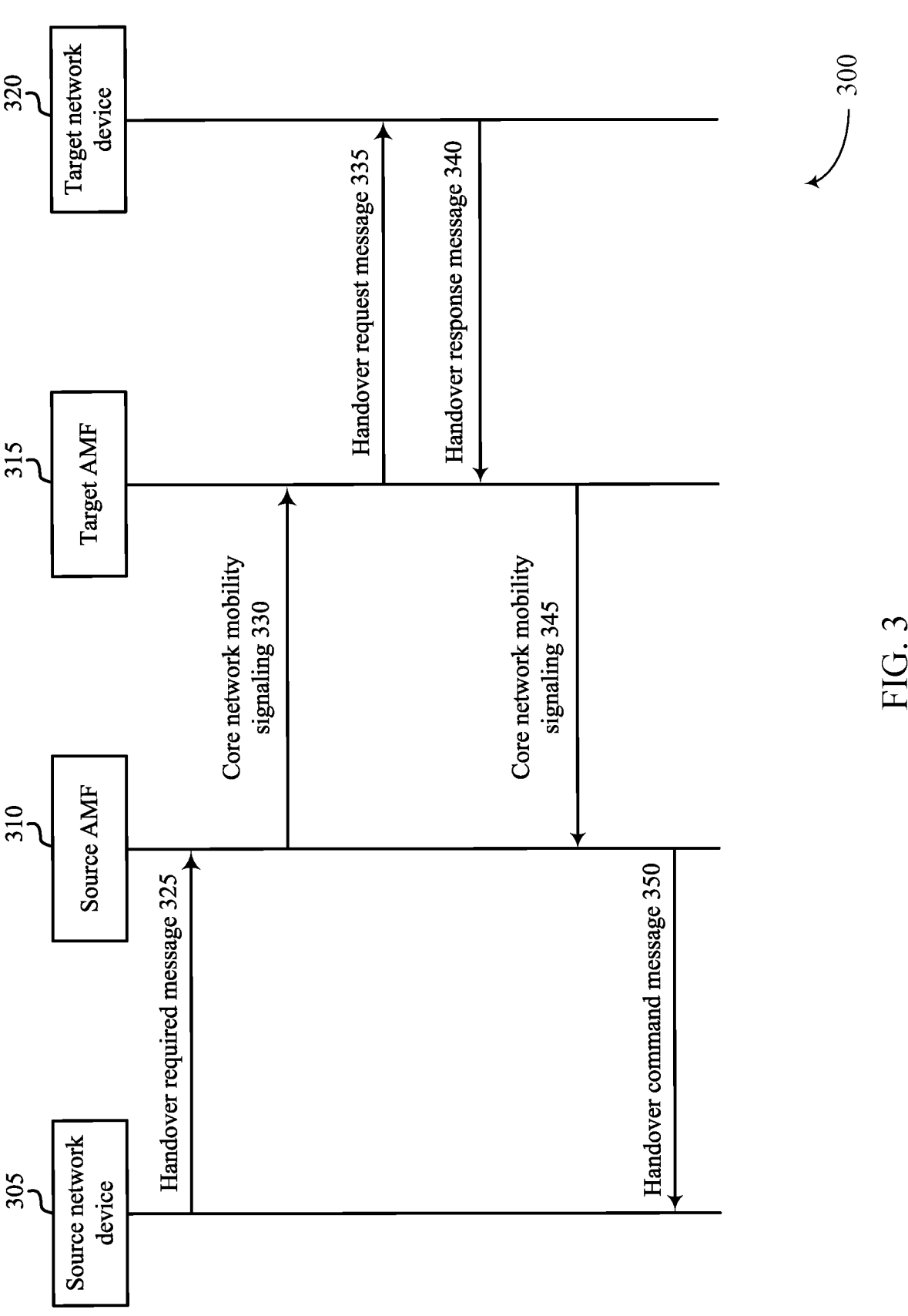
FIGS. 3 and 4 illustrate examples of wireless communications systems that support detection of remote feature support in accordance with one or more aspects of the present disclosure.

FIG. 3 illustrates an example of a wireless communications system 300 that supports detection of remote feature support in accordance with one or more aspects of the present disclosure. In some examples, the wireless communications system 300 may implement aspects of the wireless communications systems 100 and the network architecture 200 or may be implemented by aspects of the wireless communications systems 100 and the network architecture 200. For example, the wireless communications system 300 may include a source network device 305 and a target network device 320, which may be examples of network entities 105 as described herein with reference to FIGS. 1 and 2. In addition, the wireless communications system 300 may include a source AMF 310 and a target AMF 315, which may be components of a core network.

In some examples, feature support detection between two or more wireless network devices (e.g., RAN nodes such as a network entity 105) may be facilitated using some management coordination (e.g., operations, administration, and maintenance (OAM) coordination) or by some means of signaling. For example, the wireless network devices may perform the feature support detection based on explicit signaling, which may include using some form of a direct exchange of capability or feature information of a wireless network device.

In some other cases, the wireless network device may perform the feature support detection based on implicit signaling, which may indicate a particular information element corresponding to a source network device 305 at a protocol level, the information element triggering a target network device 320 to react in a particular way based on whether the target network device 320 understands the information element. In some examples, the wireless network devices may use implicit signaling to detect feature support when the source network device 305 and the target network device 320 have a direct control plane interface between them, such as an Xn interface between two base stations 140, an NG application protocol (NGAP) between a base station 140 or a network entity 105 and an AMF, and an F1 application protocol (F1AP) between a CU and a DU, among other examples.

In some examples, the source network device 305 may communicate with the target network device 320 via a core network, which may include the source AMF 310, the target AMF 315, or both. The source AMF 310 and the target AMF 315 may be the same or different devices (e.g., the source network device 305 may know the functionality of each of the source AMF 310 and the target AMF 315). For example, the source network device 305 may communicate with the target network device 320 via the core network if the wireless network devices lack a source-to-target and target-to-source transparent container information elements, which many enable direct communications between the source network device 305 and the target network device 320. In some examples, the source network device 305 and the target network device 320 may communicate via the core network as described herein for mobility between 4G and 5G network and for intra-4G wireless communication systems. For example, if the core network is part of a 4G wireless communications system, the core network may include a source MME and a target MME (e.g., which may be the same device or different devices) instead of source and target AMFs.

In attempting to perform a procedure with the target network device 320 (e.g., a handover procedure), the source network device 305 may benefit from understanding the capabilities of the target AMF 315 and the target network device 320. For example, the target AMF 315, the target network device 320, or both may lack support for one or more information elements associated with a procedure. Accordingly, the source network device 305 may use this knowledge to more efficiently perform procedures (e.g., handover procedures) with the target network device 320 as the source network device 305 may learn which features the target network device 320 supports.

In some cases, a source network device 305 (e.g., a network entity 105) may identify support for a feature X (e.g., a handover procedure) associated with a target network device 320 based on a parameter Py (e.g., an information element) that is specific to the target network device 320. For example, to perform a handover procedure, the source network device 305 may include the parameter Py in a handover request to a target network device 320 via an Xn application protocol (XnAP).

The source network device 305 may transmit a handover required message 325 to the source AMF 310. The handover required message 325 may include information relevant to a handover procedure. The information may include one or more information elements (e.g., parameters) associated with the handover procedure, such as a UE identifier or an indication of required functionality. If the source AMF 310 is unable to detect the handover required message 325, then the handover procedure may fail at the source AMF 310. Alternatively, if the source AMF 310 detects and supports the handover required message 325, the source AMF 310 may forward the information to the target AMF 315. That is, the source AMF 310 may forward core network mobility signaling 330 (e.g., Namf_Communication_CreateUECon-textRequest) to the target AMF 315. The core network mobility signaling 330 may include a process by which the target AMF 315 is requested to create a UE context, initiate mobility, or both. The request may include detailed information about a corresponding UE and the UE's context in the core network, in addition to the transparent container. The target AMF 315, which may be associated with the target network device 320, may forward the handover required message 325 and the core network mobility signaling 330 to the target network device 320 in a handover request message 335. As such, the handover request message 335 may include the one or more information elements associated with the handover procedure.

In some examples, each parameter or information element including in the handover request message 335 may have an assigned criticality. For example, a criticality setting in the XnAP may be set to "reject" or "ignore," among other examples of criticality. For example, the handover request message 335 may include the parameter Py in the XnAP, where Py may correspond to a criticality setting of "ignore" indicating that the requested handover procedure may proceed despite the feature being partially or inadequately supported. Alternatively, Py may correspond to a presence setting of "optional," which may indicate an optional setting associated with performing the request, or "mandatory," which may indicate a mandatory setting associated with performing the requested procedure. If the presence setting of Py is "mandatory" and the target network device 320 lacks support for Py, the requested procedure may fail.

Alternatively, Py may correspond to a presence setting of "reject," indicating that the target network device 320 may lack support for (e.g., fail to understand) Py based on failing to receive that particular information element previously.

If the target network device 320 lacks support for or misunderstands an information element with a high criticality level that is included in the handover request message 335, the requested handover procedure may fail at the target network device 320. As such, the target network device 320 may generate a criticality report (e.g., criticality diagnostics) for transmission back to the source network device 305 in a handover response message 340 (e.g., an ACK/NACK message). The criticality report (e.g., criticality diagnostics) may indicate a list of information elements (e.g., parameters) that the target network device 320 lacks support for, effectively causing the requested handover procedure to fail. For example, the criticality report for the target network device 320 may indicate that the target network device 320 misunderstands the parameter Py, and thus, fails to support the feature X. As such, the target network device 320 may transmit the criticality report in the handover response message 340 when the requested procedure fails based on a criticality setting of "reject," and refrain from transmitting the criticality report if the criticality setting is set to "ignore." In some cases, the target network device 320 may refrain from transmitting the criticality report in the handover response message 340 if the procedure fails based on a reason other than the criticality setting being set to "reject" (e.g., because of some transmission or processing failure).

In some cases, each information element, which may be associated with the request, may be associated with an identifier (e.g., an information element identifier). The target network device 320 may determine support for each information element in the handover request message 335 based on identifying a respective identifier, and as such, the target network device 320 may include the unsupported information elements and their identifiers in the criticality report. For example, the parameter Py may represent an optional information element indicating a CSG identifier (e.g., CSG-Id), which may be used for communications with private cells. If the target network device 320 fails to support the CSG-Id information element and thus, a corresponding CSG feature (e.g., the feature X), then the requested procedure may fail, and the target network device 320 may transmit the handover response message 340 including the criticality report to the source network device 305, the criticality report identifying the information element that caused the failure (e.g., CSG-Id).

In some examples, however, the target network device 320 may be unable to transmit the handover response message 340 to the source network device 305. For example, the handover response message 340 may include an ACK/NACK message, a failure message, or some other message that is a protocol process specific to the source network device 305 and the target network device 320. Without a direct connection between such devices, the target network device 320 may transmit the handover response message 340 to the target AMF 315, which the target AMF 315 may forward to the source AMF 310 in combination with core network mobility signaling 345 (e.g., Namf_Communication_CreateUEContextRequest). The source AMF 310 may forward the transmission from the target AMF 315 to the source network device 305 in a handover command message 350, which may indicate a reply to the requested handover procedure (e.g., indicating support or a lack of support for the requested handover procedure). However, in the case of a failure, the handover command message 350 may fail to identify whether the target AMF 315, the target network device 320, or both lacked support for the information elements included in the handover request message 335. As such, the target network device 320 may be unable to verify support for the information elements via the core network.

In some examples, techniques may support propagating the criticality report to the source network device 305 via the core network. The core network may populate the message indicating the handover request message 335 with one or more information elements with a criticality setting of "reject." Accordingly, the target network device 320 may detect a handover request failure, and include an indication of the one or more information elements with a criticality setting of "reject" in a criticality report (e.g., a criticality diagnostics information element) in the handover response message 340. In some examples, the target network device 320 may transmit the handover response message 340 including the criticality report to the target AMF 315.

The target AMF 315 may transmit core network mobility signaling 345 to the source AMF 310 (e.g., Namf_Communication_CreateUEContextRequest). The core network mobility signaling 345 may include a process by which the source AMF 310 is requested to create a UE context, initiate mobility, or both. The request may include detailed information about a corresponding UE and the UE's context in the core network, in addition to the transparent container. The target AMF 315 may transmit the core network mobility signaling 345 in combination with the handover response message 340, and the target AMF 315, the source AMF 310, or both may detect whether the target network device 320 supports the request (e.g., based on an indication of success from the target network device 320) or fails to support the request (e.g., based on an indication of failure from the target network device 320). The source AMF 310 may transmit the handover command message 350 (e.g., a handover preparation failure message) to the source network device 305 indicating the handover failure, where the handover command message 350 may include the criticality report. As such, the criticality report may be propagated from the target network device 320 to the source network device 305.

As a result, the source network device 305 may receive a criticality report for a message generated by a different network device (e.g., the handover request message 335 generated by the core network) such that the source network device 305 may detect some issues, including the failed handover request (at the target network device 320). However, the criticality report that is associated with the target network device 320 and based on the handover request message 335, generated and transmitted from the target AMF 315 to the target network device 320, may include insufficient information for the source network device 305 to determine where the failure occurred. For example, if the target AMF 315 lacks support for the feature X (e.g., a handover with the source network device 305), then the target AMF 315 may refrain from including any handover information from the source network device 305 (e.g., by way of the source AMF 310) in the handover request message 335 to the target network device 320. Accordingly, the target network device 320 may generate and transmit a criticality report back to the source network device 305 by way of the target AMF 315 and the source AMF 310. However the criticality report may lack any information and analysis relevant to the handover information at the target AMF 315 failed to include that information it the handover request message 335.

In some other examples, the target AMF 315 may support the feature X. However, the target AMF 315 may be aware that the target network device 320 previously lacked support for the feature X based on transmitting one or more information elements (e.g., UE capability identifiers) to the target network device 320, which the target network device 320 may have rejected. Upon identifying that the target network device 320 lacks support for the one or more information elements, the target AMF 315 may refrain from transmitting the information elements to the target network device 320 in the handover request message 335. As such, the target network device 320 may rely on the source network device 305 transmitting indications of the information elements to the target network device 320 within a source-to-target transparent container information element, which may increase resource and power consumption and reduce signaling efficiency. Put another way, the target AMF 315 may have previously detected a lack of support at the target network device 320 (e.g., in the context of handover or another procedure), and as such, the target AMF 315 may refrain from sending the information element that caused the failure in the handover request message 335 to avoid an inevitable handover failure at the target network device 320. Therefore, the source network device 305 may fail to receive any indication of feature detection at the target network device 320 (e.g., supported or unsupported), and any future behavior of the source network device 305 may depend on receiving such an indication of whether the feature is supported at the target network device 320.

Alternatively, the source network device 305 may refrain from transmitting any information to the core network to assist the target network device 320 in the handover request, which may result in the target network device 320 failing to receive any information about the requested handover and subsequently failing the handover request or accepting the handover request but subsequently requesting the information elements from the source network device 305, which may further increase signaling overhead. That is, the target AMF 315 may lack support for the handover procedure and as such may fail to ever transmit the requested information elements to the target network device 320 in the handover request message 335 such that the target network device 320 is unable to determine whether it supports the information elements (e.g., because of the absence of presence of the information elements in the handover request message 335). As such, in a particular case either the target AMF 315, the target network device 320, or both may lack support for the handover request triggered by the source network device 305 and may indicate a failure accordingly, however the source network device 305 may be unaware of which device caused the failure.

The techniques described herein support remote feature detection for the source network device 305 and the target network device 320, which may communicate via the source AMF 310 and the target AMF 315. The source network device 305 and the target network device 320 may communicate via source-to-target and target-to-source transparent container information elements such that the network devices may avoid interference from the core network. In some examples, the source network device 305 may transmit a request message (e.g., a handover request message) to the target network device 320 via the core network. The request may include a source-to-target transparent container information element that may include an indication of one or more information elements included in the request.

Because the source-to-target transparent container information element is configured for forwarding (intended to be forwarded) to the target network device 320 without any interference by the core network, the target network device 320 may receive the source-to-target transparent container information element and subsequently, may generate a report indicating which information elements included in the request the target network device 320 supports. In some examples, the target network device 320 may generate the report based on receiving the source-to-target transparent container information element, or the source-to-target transparent container information element may include a request to generate the report. The target network device 320 may provide the report to the source network device 305 via a target-to-source transparent container information element associated with a response message (e.g., a handover response message). The source network device 305 may use the report, in combination with the response message, to determine which information elements are supported by the target network device 320, the target AMF 315, or both, which may enable the source network device 305 to perform more efficient communications with the target network device 320.

By performing the remote feature detection as described herein using the source-to-target and target-to-source transparent container information elements, communications between the source network device 305 and the target network device 320 may be improved. For example, utilizing the transparent container information elements may enable the source network device 305 to communicate with the target network device 320 without interference from the source AMF 310, the target AMF 315, or other components of a core network, which may enable the source network device 305 to understand whether a request may fail at the target AMF 315, the target network device 320, or both. In addition, the described techniques may enable the source network device 305 to request and receive both presence diagnostics and criticality diagnostics, which may provide more information about which information elements the target network device 320 supports, enabling the source network device 305 to transmit procedure requests more efficiently, increasing the reliability of communications with the target network device 320, among other benefits.

Figure 4:
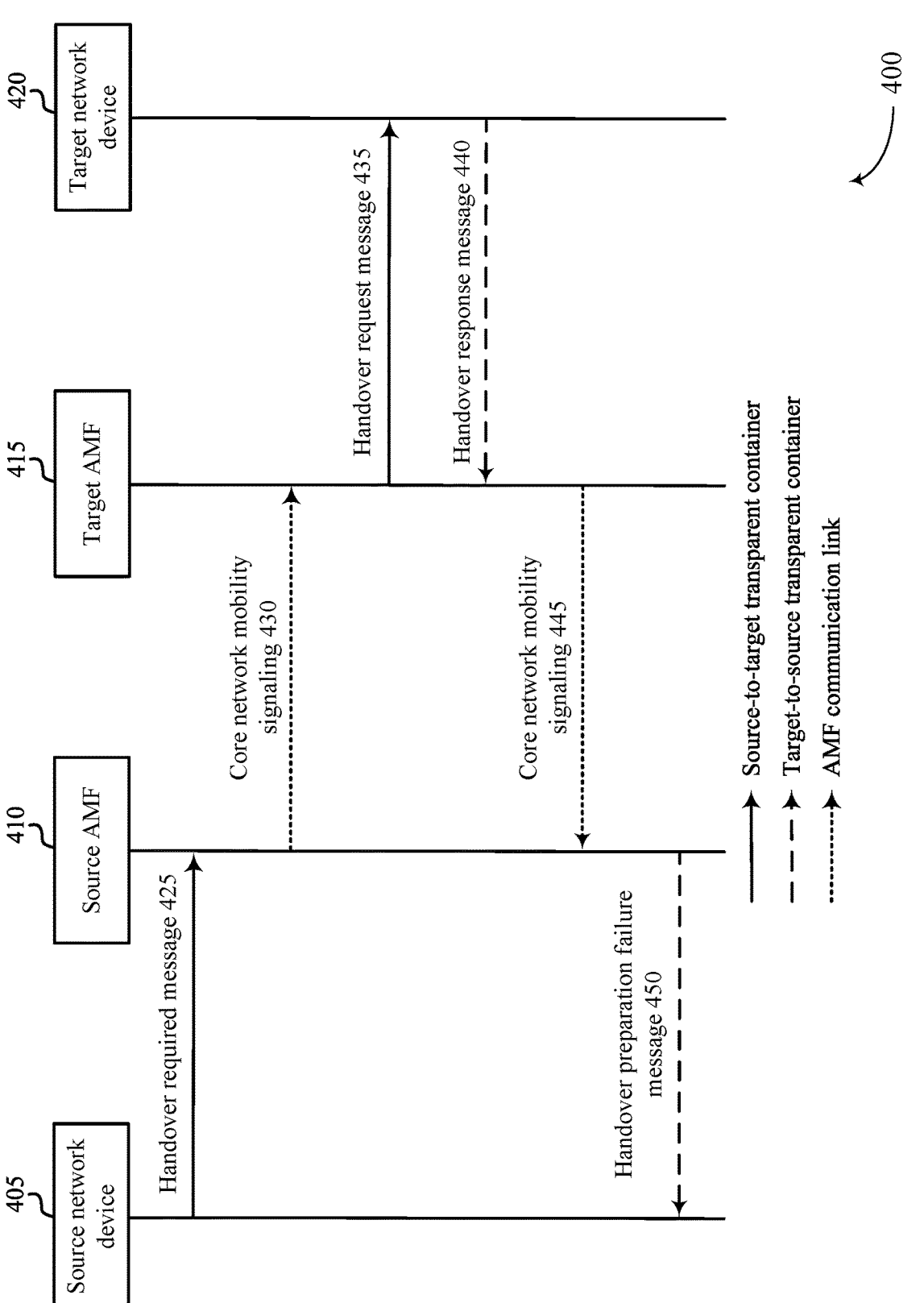

FIG. 4 illustrates an example of a wireless communications system 400 that supports detection of remote feature support in accordance with one or more aspects of the present disclosure. In some examples, the wireless communications system 400 may implement aspects of the wireless communications systems 100 and the network architecture 200 or may be implemented by aspects of the wireless communications systems 100 and the network architecture 200. For example, the wireless communications system 400 may include a source network device 405 and a target network device 420, which may be examples of network entities or base stations as described herein with reference to FIGS. 1 through 3. In addition, the wireless communications system 400 may include a source AMF 410 and a target AMF 415, which may be components of a core network.

As described herein, the source network device 405 may communicate with the target network device 420 via a core network, which may include the source AMF 410, the target AMF 415, or both (e.g., where the source AMF 410 and the target AMF 415 may be the same or different devices). In some examples, the wireless communications system 400 may enable reporting of information elements the target network device 420 may understand in a remote message regardless of whether the target network device 420 supports a procedure (e.g., a handover procedure) associated with the information elements. In addition, the source network device 405 and the target network device 420 may use a source-to-target transparent container information element and a target-to-source transparent container information element, which may enable the network devices to perform the reporting directly with each other without interference from the core network.

The source network device 405 may transmit a first request (e.g., a handover request) to the target network device 420 via the core network. In some examples, the first request may include a source-to-target transparent container information element. The source network device 405 may include, within the source-to-target transparent container information element, an indication of one or more information elements, where the source-to-target transparent container information element is configured for forwarding to the target network device 420 by the core network (e.g., the source AMF 410, the target AMF 415, or both). For example, the source network device 405 may transmit a handover required message 425 to the source AMF 410, the handover required message 425 indicating information about a handover procedure the source network device 405 is requesting to perform with the target network device 420. The source AMF 410 and the target AMF 415 may translate the handover required message 425 into a handover request message 435, where the one or more information elements associated are associated with the handover request message. For example, upon receiving the handover required message 425, the source AMF 410 may transmit core network mobility signaling 430 associated with the handover required message 425 (e.g., Namf_Communication-_CreateUEContextRequest) to the target AMF 415. The core network mobility signaling 430 may include a process that requests the target AMF 415 to create a UE context, initiate mobility, or both. The request may include detailed information about a corresponding UE and the UE's context in the core network, in addition to the transparent container. The source AMF 410 and the target AMF 415 may communicate via an AMF communication link or some other core network communication link. In some cases, the target AMF 415 may use the core network mobility signaling 430 in translating the handover required message 425 into the handover request message 435. As such, the source network device 405 may transmit the handover request to the target network device 420 via the source AMF 410 and the target AMF 415 over communication links, and the indication of the one or more information elements via the source-to-target transparent container information element, which the source AMF 410 and the target AMF 415 may forward to the target network device 420.

In response to receiving the handover request message 435, the target network device 420 may generate a report that indicates whether individual information elements of the one or more information elements are present in the handover request message 435 as received at the target network device 420 or supported by the target network device 420. In some examples, the report may be associated with a handover response message 440 transmitted in response to the handover request message 435, and the target network device 420 may include the report within a target-to-source transparent container information element of the handover response message 440 that is configured for forwarding to the source network device 405 by the core network. To indicate whether the individual information elements are present in the handover request message 435, the report may include a list of the individual information elements that target network device 420 received in the handover request message 435. To indicate whether the target network device 420 supports the individual information elements, the report may indicate which of the individual information elements the target network device 420 understands (e.g., supports) or misunderstands (e.g., does not support).

In some cases, the target network device 420 may transmit the handover response message 440 to the source network device 405 via the core network (e.g., the source AMF 410, the target AMF 415, or both). The handover response message 440 may include an ACK message or a failure message (e.g., a NACK). For example, the target network device 420 may transmit the handover response message 440 to the target AMF 415. The target AMF 415 may forward the handover response message 440 to the source AMF 410 in combination with core network mobility signaling 445 (e.g., Namf_Communication_CreateUEContextRequest), where the source AMF 410 and the target AMF 415 may communicate via an AMF communication link or some other core network communication link.

The core network mobility signaling 445 may include a process by which the source AMF 410 is requested to create a UE context, initiate mobility, or both. The request may include detailed information about a corresponding UE and the UE's context in the core network, in addition to the transparent container. In some examples, the source AMF 410 may translate into a handover preparation failure message 450 to be transmitted to the source network device 405. As such, the target network device 420 may transmit the handover preparation failure message 450 to the source network device 405 via the core network, while the report may be transmitted to the source network device 405 via the target-to-source transparent container information element.

Using the source-to-target and target-to-source transparent container information elements as described herein, the target network device 420 may report a list of understood (e.g., supported), individual information elements from a remote message (e.g., the handover request message 435), regardless of whether the target network device 420 supports the corresponding handover procedure (e.g., regardless of whether the procedure failed). In addition, by including the list of individual information elements supported by the far-end (e.g., including the target AMF 415, the target network device 420, or both) in the target-to-source transparent container information element, the source network device 405 may analyze the list as it may lack interference from the core network. As such, even if the requested procedure is successful, the source network device 405 may check a state of support of one or more information elements (e.g., a feature) at the far-end using the list of supported information elements. For example, if the target AMF 415, the target network device 420, or both fail to support a particular feature (e.g., a UE capability identifier), then the report may exclude an information element corresponding to the particular feature, and thus, the source network device 405 may detect that the requested procedure is not supported. Alternatively, the report may explicitly indicate that the target network device 420 lacks support for a particular feature associated with an information element. Alternatively, if the report includes the information element and if the procedure is successful, the source network device 405 may determine that the target AMF 415 and the target network device 420 support the corresponding feature. As such, the source network device 405 may refrain from requesting additional information from target network device 420, which may reduce power consumption and increase resource efficiency at the source network device 405.

In response to receiving the report from the target network device 420 in the target-to-source transparent container information element, the source network device 405 may identify presence of the individual information elements in the handover request message 435, support of the individual information elements from the target network device 420, or both. For example, the source network device 405 may identify that the handover request message 435, as received by the target network device 420, includes the individual information elements based on the individual information elements being included in the report transmitted by the target network device 420. That is, if the individual information elements are missing from the handover request message 435, the source network device 405 may identify that the target AMF 415 may lack support for the associated functionality. Additionally, or alternatively, the source network device 405 may identify that the target network device 420 supports the individual information elements from the report transmitted by the target network device 420.

In some examples, the source network device 405 may identify, from a combination of the report transmitted via the target-to-source transparent container information element and the handover preparation failure message 450 (e.g., based on the handover response message 440), whether the source AMF 410, the target AMF 415, or any other function of the core network supports the individual information elements. For example, the source network device 405 may identify that the target network device 420 supports the individual information elements from the report.

In addition, the source network device 405 may identify that the target network device 420 failed to perform the first request from the handover preparation failure message 450. That is, the source network device 405 may detect that the requested handover procedure with the target network device 420 failed. Accordingly, the source network device 405 may conclude that at least the target AMF 415 of the core network lacks support of at least one of the individual information elements. That is, if the target AMF 415 lacks support for an individual information element, and the target network device 420 does support the individual information element, then the source network device 405 may conclude that the target AMF 415 is not deploying a feature corresponding to the individual information element and causing the failure.

In some cases, the target network device 420 may successfully perform the request if both the target AMF 415 and the target network device 420 support one or more corresponding information elements (e.g., features), or if the target AMF 415 lacks support for the one or more corresponding information elements, where the information elements may be ignored such that the procedure is still successful (e.g., the information elements may be relatively less critical than other information elements necessary to performing the procedure). Using this information, the source network device 405 may identify whether the target AMF 415, the target network device 420, or both support or lack support for the individual information elements. As such, whether the target AMF 415 lacks support for the individual information elements, or the target AMF 415 detects that the target network device 420 lacks support for the individual information elements (e.g., based on previous attempts) and therefore refrains from including the unsupported information elements in the handover request message 435, the report may lack the unsupported information elements, while the procedure may still be successful.

In some examples, the source network device 405 may include an explicit request within the source-to-target transparent container information element. The explicit request may be for the target network device 420 to prepare the report to indicate presence diagnostics information for whether the handover request message 435 includes the individual information elements, or whether the target network device 420 supports the individual information elements. That is, the source network device 405 may specifically request presence diagnostics information from the target network device 420, where the target network device 420 may transmit the presence diagnostics information in the report via the target-to-source transparent container information element.

In addition, the explicit request may be specific to a particular information element. That is, the source network device 405 may identify a specific information element for which presence diagnostics information is requested in the explicit request. A respective information element identifier or a range of information element identifier may indicate the specific information element. Accordingly, the report transmitted by the target network device 420 may include an information element identifier of each of the individual information elements, in addition to a respective presence of each individual information element in the handover request message 435 or a respective support by the target network device 420 for each individual information element.

In some cases, regardless of whether the requested procedure fails or is successful, the target network device 420 may add the presence diagnostics information in the report configured for forwarding to the source network device 405 within the target-to-source transparent container information element. In some examples, the presence diagnostics information may include one or more parameters, as indicated in Table 1 below:

TABLE 1

| Information Element (IE)/ Group Name | Presence | Range | IE Type and Reference |
|---|---|---|---|
| Presence Diagnostics | | 0 . . . <maxnoof InfoElements> | |
| >IE Criticality | M | | ENUMERATED(reject, ignore, notify) |
| >IE ID | M | | INTEGER (0.65535) |
| >IE status | M | | ENUMERATED (understood, not understood, . . .) |

In Table 1, the Information Element/Group Name field may indicate a list of individual information elements that the target network device 420 received in the handover request message 435. The list may include some quantity of information elements as indicated by the Range field in Table 1. In addition, the IE Criticality field may report the criticality of the received information element. For example, an information element may have a reject level of criticality, an ignore level of criticality, or a notify level of criticality, among other criticality levels. In some examples, the ID field may indicate an information element identifier corresponding to a received information element, and the status field may indicate support of the information element by the target network device 420. For example, the status field may indicate that the target network device 420 supports the information element (e.g., understood) or that the target network device 420 lacks support for the information element (e.g., not understood). In addition, the presence or absence of the information element in the handover request message 435 may be implicitly indicated by its presence or absence in the report, or alternatively by an explicit indication.

In addition to the presence diagnostics information, the target network device 420 may transmit a criticality report to the source network device 405 in the target-to-source transparent container information element. In some examples, the target network device 420 may transmit the criticality report in response to receipt and failure of the handover request message 435. For example, if the target network device 420 receives the handover request message 435 and fails to support one or more information elements that have a high criticality level as indicated in the source-to-target transparent container information element, the target network device 420 may generate and transmit the criticality report to the source network device 405. As such, the criticality report is different from the report carrying the presence diagnostics information, which is responsive to the target network device 420 receiving the indication within the source-to-target transparent container information element associated with the handover request message 435.

In some examples, the criticality report may indicate one or more critical information elements that are unsupported by the target network device 420. In some examples, the criticality report may include the critical information elements based on a level of criticality of each of the one or more information elements. In addition, information elements with a reject level of criticality may be included in the criticality report. That is, the target network device 420 may be triggered to transmit the criticality report if the handover request message 435 includes one or more criticality information elements that the target network device 420 fails to support or that are missing from the handover request message, and therefore, have a reject level of criticality.

In some cases, the source network device 405 may indicate the one or more information elements within the source-to-target transparent container information element of the handover request message 435 via one or more criticality levels corresponding to the one or more information elements (e.g., the IE Criticality field). As such, the report transmitted within the target-to-source transparent container information element may indicate the individual information elements associated with the handover request message 435 and that correspond to the one or more criticality levels. In some cases, a first level of criticality may correspond to a criticality diagnostics report, and may be indicative of whether the criticality diagnostics report is to be provided to the source network device 405. That is, the criticality diagnostics report may include a list of individual information elements misunderstood (e.g., un-supported) by the target network device 420, and a list of mandatory, critical information elements having a reject level of criticality, and that are missing from the handover request message 435.

In addition, a second level of criticality may correspond to a reject criticality, and may be indicative that the report is to indicate information elements having the reject criticality in the handover request message 435 or support for the information elements having the reject criticality by the target network device 420. That is, the second level may correspond to a list of individual information elements included in the handover request message 435 as received at the target network device 420 and that the target network device 420 supports, with a reject level of criticality. Additionally, or alternatively, a third level may correspond to an ignore criticality and may be indicative that the report is to indicate support by the target network device for information elements having the ignore criticality. That is, the third level may correspond to a list of individual information elements included in the handover request message 435 as received at the target network device 420 that have an ignore level of criticality. In some cases, the source network device 405 may indicate a request for the criticality levels cumulatively (e.g., via a bitmap, where different bits in the bitmap may correspond to different criticality levels).

Based on the request for the criticality levels from the source network device 405 included in the source-to-target transparent container information element, the responsive report may include three lists corresponding to the criticality levels in the request. That is, the report may include the criticality diagnostics (e.g., a list of information elements with corresponding attributes indicating that the information elements are missing from the request or misunderstood by the target network device 420), a reject criticality (e.g., a list of information elements included in the handover request message 435 as received at the target network device 420 with a reject level of criticality), and an ignore criticality (e.g., a list of information elements with corresponding attributes indicating that the information elements are understood or misunderstood by the target network device 420). In some examples, the target network device 420 may include the criticality diagnostics in the report if the procedure fails.

In some cases, the reporting techniques described herein may apply for other procedures (e.g., capability reporting), where network devices may communicate via a core network. For example, a source network device 405 (e.g., A) may communicate with a core network (e.g., B), which may communicate with a target network device 420 (e.g., C), where the communications may occur back to the source network device 405 in the reverse order (e.g., A to B, B to C, C to B, and B to A). In some examples, the core network may include one or more AMFs, such as the source AMF 410 and the target AMF 415. The source network device 405 may transmit a request via the core network to receive a report on a request message received by the target network device 420. In some cases, the source network device 405 and the target network device 420 may communicate the request and the report directly with each other via a transparent container (e.g., source-to-target, target-to-source), which the core network may forward without interference.

If the network devices lack transparent containers, and if the source network device 405 still requests information regarding which features are supported by the target network device 420, the network devices may be unable to directly communicate the request and the report with each other (e.g., as in the case of a handover procedure as described with reference to FIG. 4). For example, the source network device 405 may transmit the request for the report to the core network with an indication of a message type for which the report is requested (e.g., a B to C message), and an indication of the target network device 420, or at least its device type if a corresponding identifier is unknown. When such a message is transmitted, the core network may incorporate the request for the report in the message, where the report may be transmitted in a reply to the core network.

In some cases, the core network may forward the report to the source network device 405. As such, the messages communicated between one or more functions of the core network may occur in different interfaces (e.g., in addition to different interface instances of N2 as for handover procedures). For example, an AMF may transmit a context setup request to a CU of a network device in an NGAP or an N2 interface, and may request a report from an F1 interaction with a DU of the network device. The CU may transmit a context setup request to the DU on the F1 interface and may receive the report in a reply message, which may be configured for forwarding to an AMF in a context setup ACK message.

Figure 5:
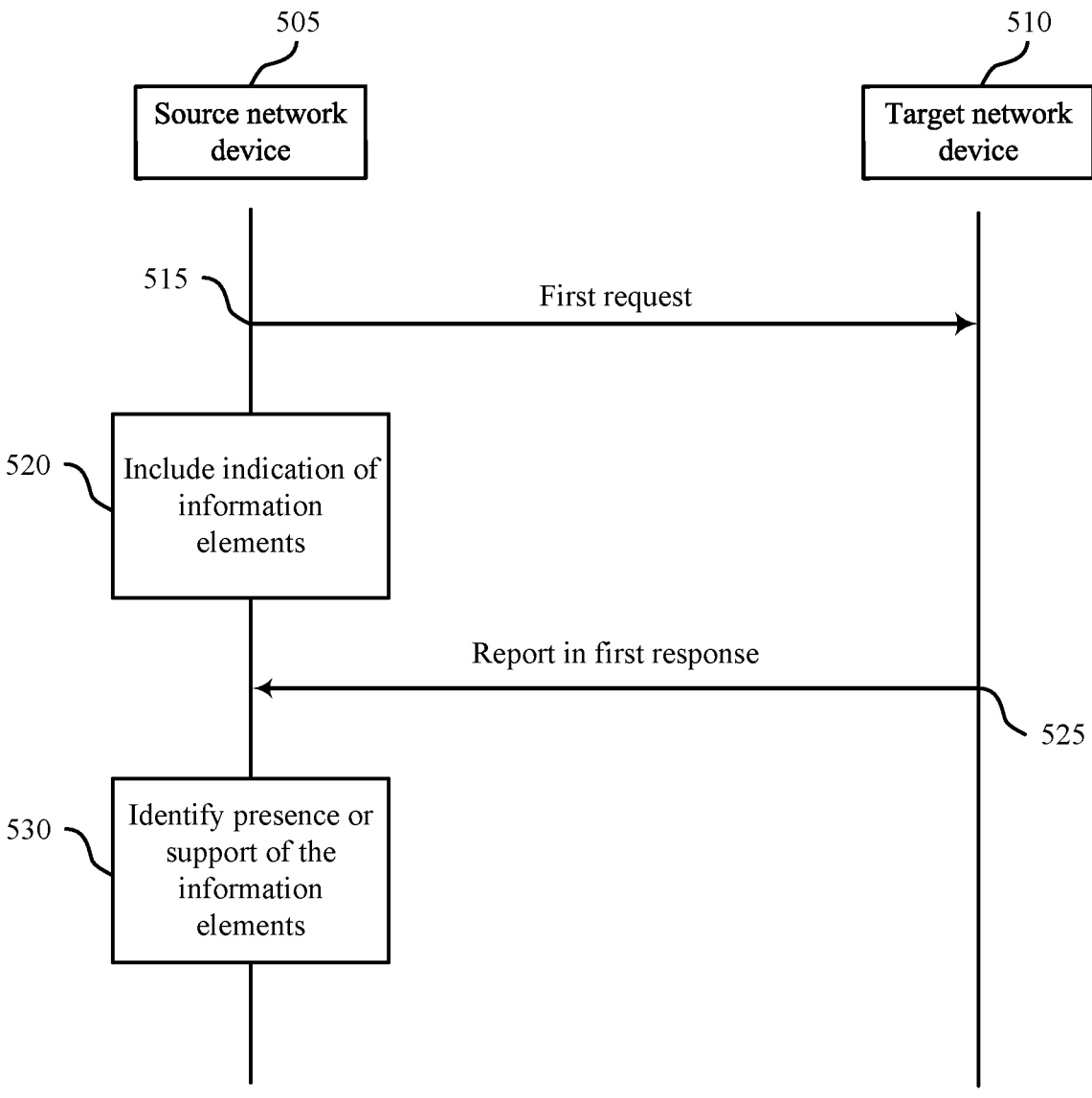
FIG. 5 illustrates an example of a process flow that supports detection of remote feature support in accordance with one or more aspects of the present disclosure.

FIG. 5 illustrates an example of a process flow 500 that supports detection of remote feature support in accordance with one or more aspects of the present disclosure. The process flow 500 may implement aspects of wireless communications systems 100, or may be implemented by aspects of the wireless communications system 100. For example, the process flow 500 may illustrate operations between a source network device 505 and a target network device 510, which may be examples of corresponding devices (e.g., network entities) described herein. In the following description of the process flow 500, the operations between the source network device 505 and the target network device 510 may be transmitted in a different order than the example order shown, or the operations performed by the source network device 505 and the target network device 510 may be performed in different orders or at different times. Some operations may also be omitted from the process flow 500, and other operations may be added to the process flow 500.

At 515, the source network device 505 may transmit, to the target network device 510 and via a core network, a first request. In some examples, the first request may be a handover required message transmitted by the source network device 505 to the core network, and translated by one or more functions (e.g., AMFs) of the core network into a handover request message, where one or more information elements may be associated with the handover request message.

At 520, the source network device 505 may include, within a source-to-target transparent container information element of the first request, an indication of the one or more information elements, the source-to-target transparent container information element configured for forwarding to the target network device 510. That is, the source network device 505 may communicate the indication of the one or more information elements directly to the target network device 510 via the source-to-target transparent container information element without interference from the core network (e.g., as the core network forwards, but refrains from impacting, the source-to-target transparent container information element).

At 525, the source network device 505 may receive, from the target network device 510 and via the core network, in association with a first response to the first request and within a target-to-source transparent container information element of the first response, a report indicative of whether individual information elements of the one or more information elements are present in the first request, as received at the target network device 510, or are supported by the target network device 510. That is, the target network device 510 may transmit the first response to the source network device 505 and via the core network. For example, the first response may include an ACK message if the request is successful, or a failure message if the request fails at the target network device 510. In addition, the target network device 510 may transmit the report in the target-to-source transparent container information element, which may be configured for forwarding to the source network device 505 by the core network without any interference. In some cases, the report may include presence diagnostic information. Additionally, or alternatively, the target network device 510 may transmit a criticality report to the source network device 505.

At 530, the source network device 505 may identify, from the report, that the handover request message includes the individual information elements or lacks the individual information elements. Additionally, the source network device 505 may identify, from the report, that the target network device 510 does support or lacks support for the individual information elements. In some examples, from a combination of the report and the first response, the source network device 505 may identify whether the one or more functions of the core network (e.g., a target AMF) supports the individual information elements.

Figure 6:
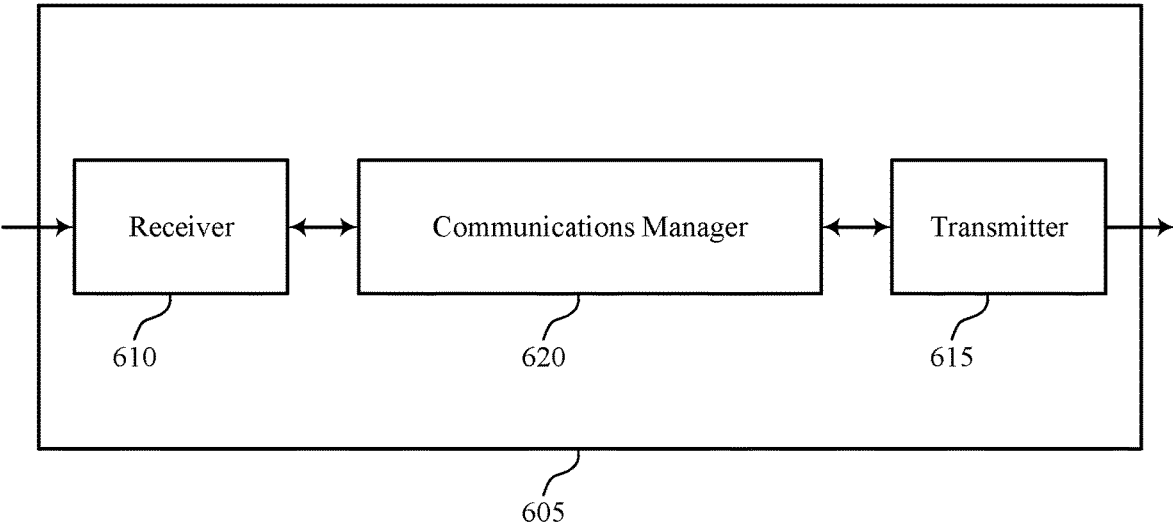
FIGS. 6 and 7 show block diagrams of devices that support detection of remote feature support in accordance with one or more aspects of the present disclosure.

FIG. 6 shows a block diagram 600 of a device 605 that supports detection of remote feature support in accordance with one or more aspects of the present disclosure. The device 605 may be an example of aspects of a source network device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to detection of remote feature support). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to detection of remote feature support). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of detection of remote feature support as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a source network device in accordance with examples as disclosed herein. For example, the communications manager 620 may be configured as or otherwise support a means for transmitting a first request from the source network device to a target network device via a core network. The communications manager 620 may be configured as or otherwise support a means for including, within a source-to-target transparent container information element of the first request, an indication of one or more information elements, the source-to-target transparent container information element configured for forwarding to the target network device. The communications manager 620 may be configured as or otherwise support a means for receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for remote feature support detection, which may enable source and target network devices to communicate via source-to-target and target-to-source transparent containers forwarded by a core network, without interference from the core network. As such, the described techniques may reduce power consumption and improve resource efficiency at the source network device, improving overall communications between the source and target network devices, among other benefits.

Figure 7:
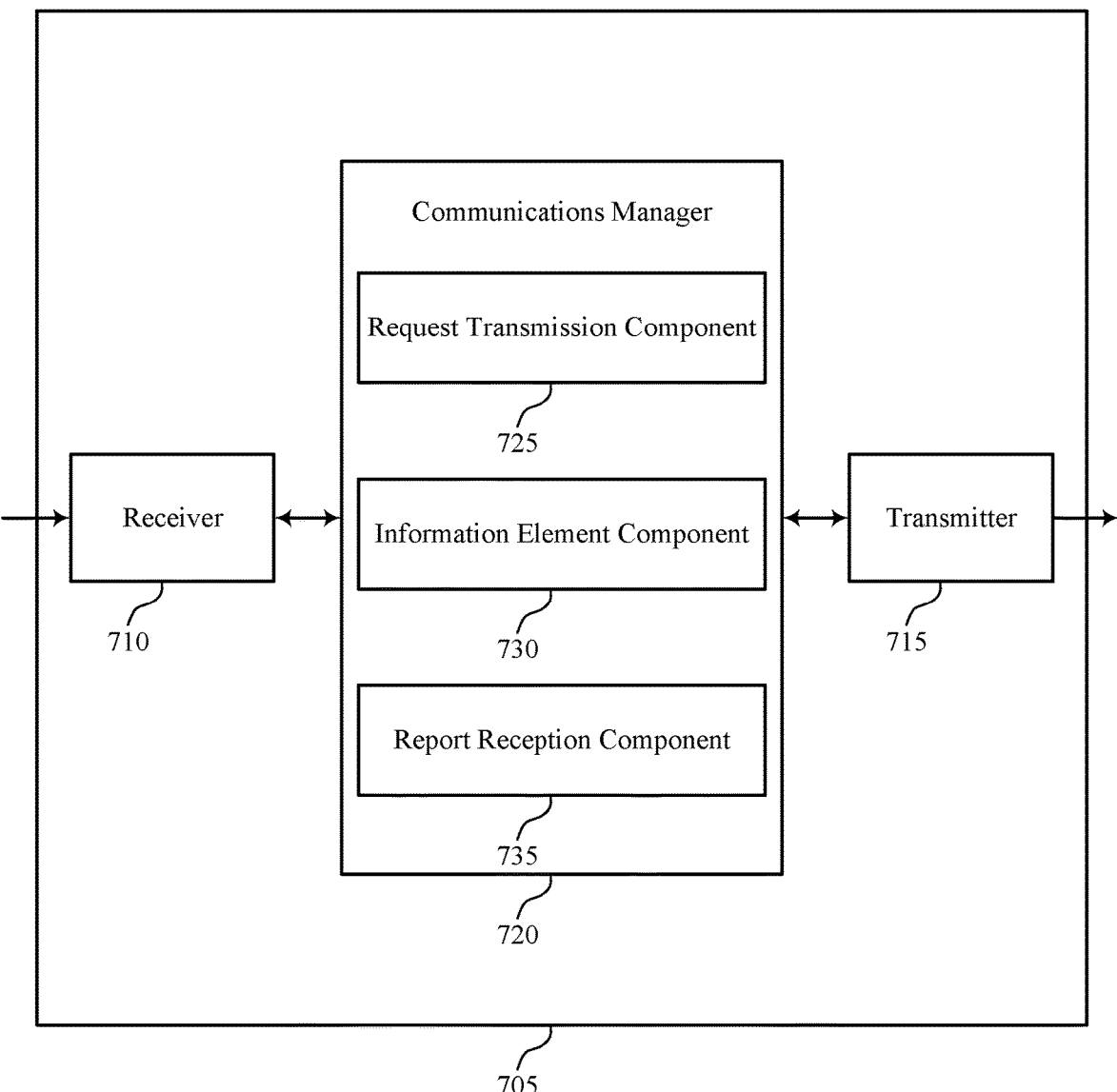

FIG. 7 shows a block diagram 700 of a device 705 that supports detection of remote feature support in accordance with one or more aspects of the present disclosure. The device 705 may be an example of aspects of a device 605 or a source network device as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to detection of remote feature support). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to detection of remote feature support). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of detection of remote feature support as described herein. For example, the communications manager 720 may include a request transmission component 725, an information element component 730, a report reception component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a source network device in accordance with examples as disclosed herein. The request transmission component 725 may be configured as or otherwise support a means for transmitting a first request from the source network device to a target network device via a core network. The information element component 730 may be configured as or otherwise support a means for including, within a source-to-target transparent container information element of the first request, an indication of one or more information elements, the source-to-target transparent container information element configured for forwarding to the target network device. The report reception component 735 may be configured as or otherwise support a means for receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

Figure 8:
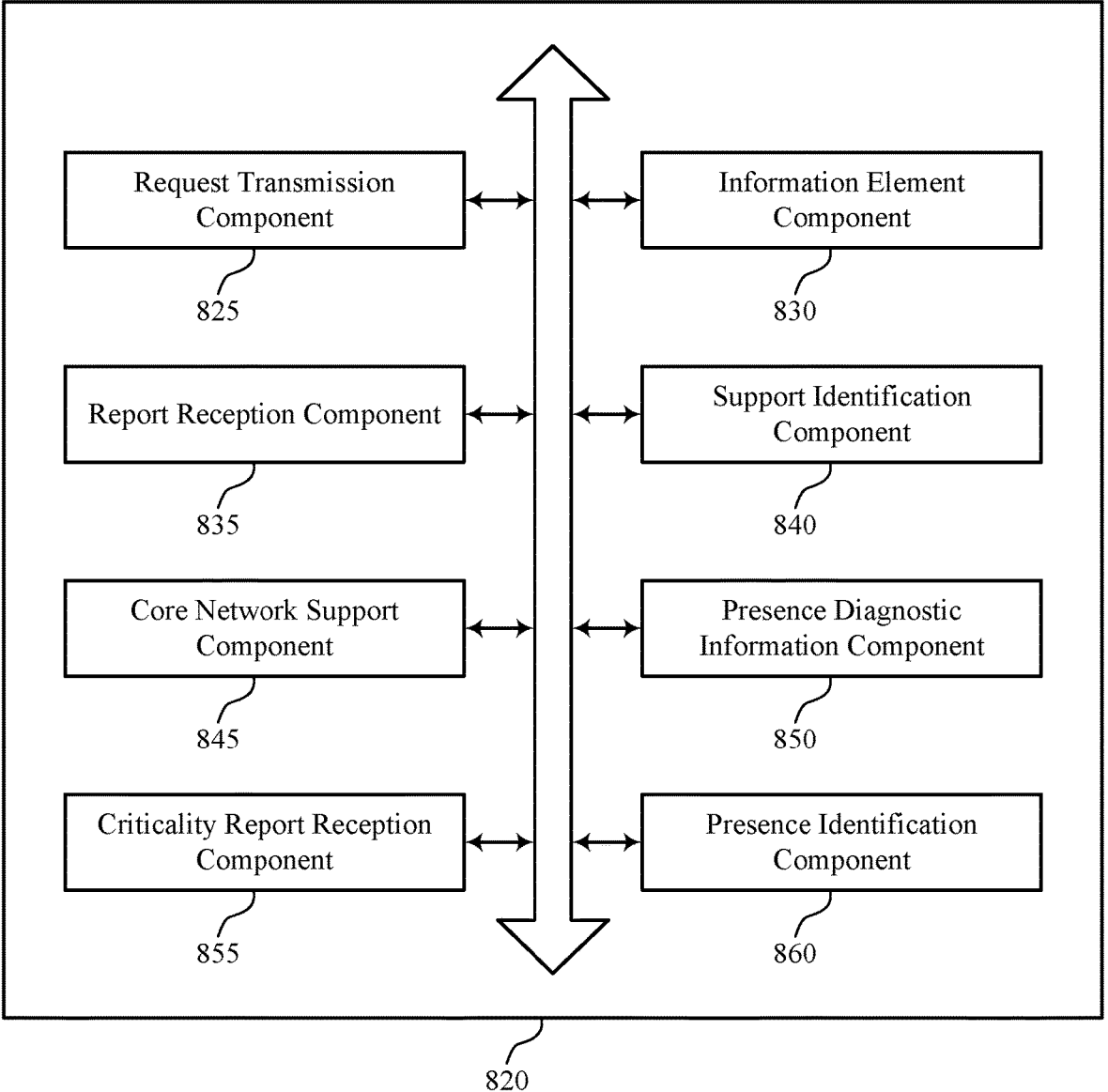
FIG. 8 shows a block diagram of a communications manager that supports detection of remote feature support in accordance with one or more aspects of the present disclosure.

FIG. 8 shows a block diagram 800 of a communications manager 820 that supports detection of remote feature support in accordance with one or more aspects of the present disclosure. The communications manager 820 may be an example of aspects of a communications manager 620, a communications manager 720, or both, as described herein. The communications manager 820, or various components thereof, may be an example of means for performing various aspects of detection of remote feature support as described herein. For example, the communications manager 820 may include a request transmission component 825, an information element component 830, a report reception component 835, a support identification component

840, a core network support component 845, a presence diagnostic information component 850, a criticality report reception component 855, a presence identification component 860, or any combination thereof. Each of these components may communicate, directly or indirectly, with one another (e.g., via one or more buses).

The communications manager 820 may support wireless communication at a source network device in accordance with examples as disclosed herein. The request transmission component 825 may be configured as or otherwise support a means for transmitting a first request from the source network device to a target network device via a core network. The information element component 830 may be configured as or otherwise support a means for including, within a source-to-target transparent container information element of the first request, an indication of one or more information elements, the source-to-target transparent container information element configured for forwarding to the target network device. The report reception component 835 may be configured as or otherwise support a means for receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

In some examples, the first request is a handover required message transmitted by the source network device and translated into a handover request message, and where the one or more information elements are associated with the handover request message.

In some examples, the presence identification component 860 may be configured as or otherwise support a means for identifying, from the report, that the handover request message includes the individual information elements.

In some examples, the presence identification component 860 may be configured as or otherwise support a means for identifying, from the report, that the handover request message does not include the individual information elements.

In some examples, the support identification component 840 may be configured as or otherwise support a means for identifying, from the report, that the target network device supports the individual information elements.

In some examples, the support identification component 840 may be configured as or otherwise support a means for identifying, from the report, that the target network device does not support the individual information elements.

In some examples, the core network support component 845 may be configured as or otherwise support a means for identifying, from a combination of the report and the first response, whether the one or more functions of the core network support the individual information elements.

In some examples, to support identifying whether the one or more functions of the core network support the individual information elements, the core network support component 845 may be configured as or otherwise support a means for identifying, from the report, that the target network device supports the individual information elements. In some examples, to support identifying whether the one or more functions of the core network support the individual information elements, the core network support component 845 may be configured as or otherwise support a means for identifying, from the first response, that the target network device failed to perform the first request. In some examples, to support identifying whether the one or more functions of the core network support the individual information elements, the core network support component 845 may be configured as or otherwise support a means for concluding, based on the report and the first response, that at least one of the one or more functions of the core network does not support at least one of the individual information elements.

In some examples, the presence diagnostic information component 850 may be configured as or otherwise support a means for including, within the source-to-target transparent container information element of the first request, an explicit request for the target network device to prepare the report to indicate presence diagnostic information for whether the first request includes individual information elements of the one or more information elements or whether the target network device supports the individual information elements.

In some examples, to support including the explicit request within the source-to-target transparent container information element, the presence diagnostic information component 850 may be configured as or otherwise support a means for identifying, in the explicit request, a specific information element of the one or more information elements for which presence diagnostic information is requested, the specific information element indicated by a respective information element identifier or range of information element identifiers.

In some examples, the report includes an identification of each of the individual information elements, a respective presence of each of the individual information elements in the first request as received by the target network device, or a respective support by the target network device for each of the individual information elements.

In some examples, the criticality report reception component 855 may be configured as or otherwise support a means for receiving a criticality report in the target-to-source transparent container information element, where the criticality report is responsive to receipt and failure of the first request by the target network device and is different from the report, which is responsive to receipt, by the target network device, of the indication within the source-to-target transparent container information element of the first request.

In some examples, the criticality report indicates one or more critical information elements that are unsupported by the target network device, the one or more critical information elements included in the criticality report based on a level of criticality of each of the one or more information elements. In some examples, the level of criticality for inclusion of the one or more critical information elements in the criticality report includes a reject level of criticality.

In some examples, to support including the indication of the one or more information elements within the source-to-target transparent container information element of the first request, the information element component 830 may be configured as or otherwise support a means for indicating the one or more information elements via one or more criticality levels corresponding to the one or more information elements, where the report indicates the individual information elements and that correspond to the one or more criticality levels.

In some examples, the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

Figure 9:
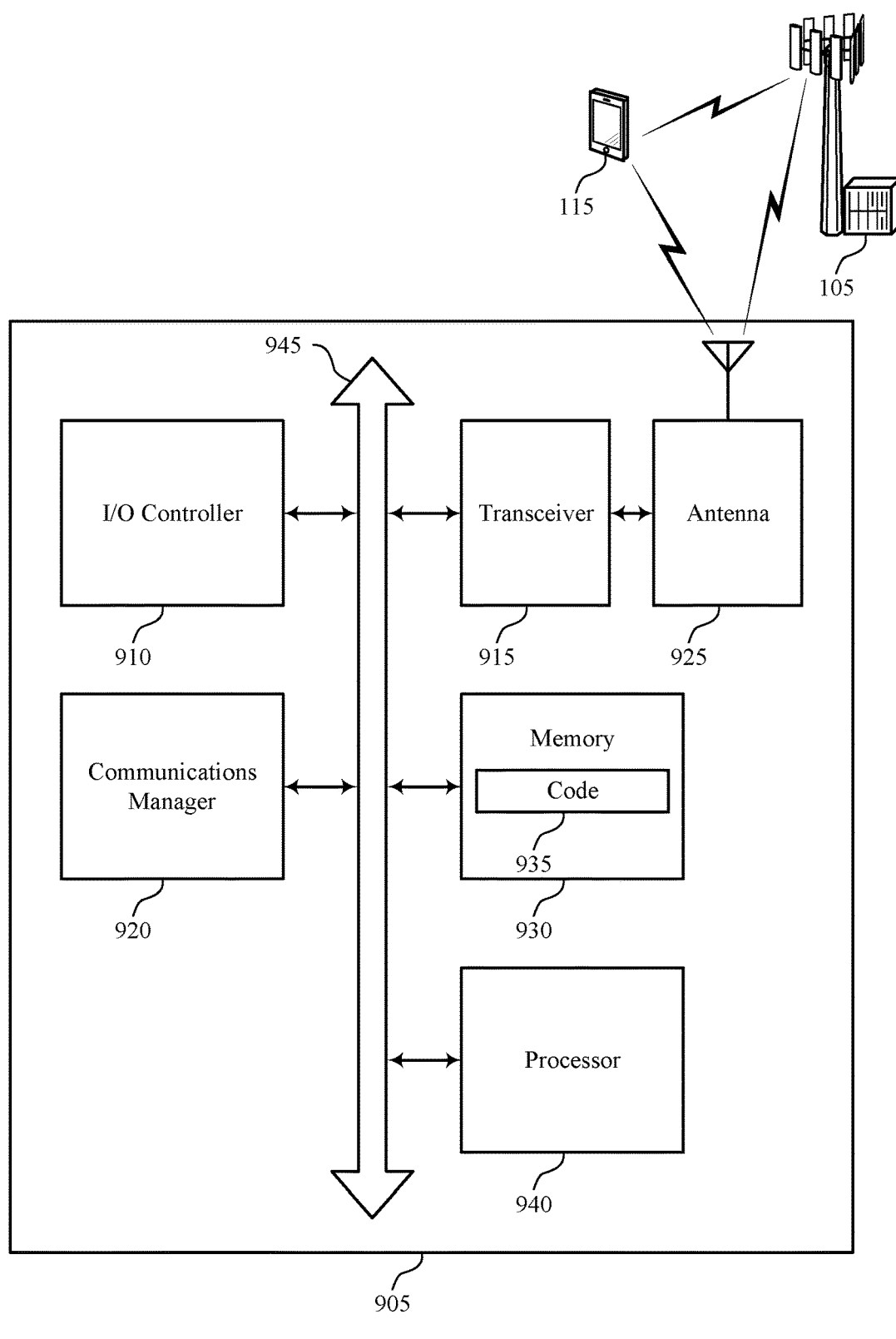
FIG. 9 shows a diagram of a system including a device that supports detection of remote feature support in accordance with one or more aspects of the present disclosure.

FIG. 9 shows a diagram of a system 900 including a device 905 that supports detection of remote feature support in accordance with one or more aspects of the present disclosure. The device 905 may be an example of or include the components of a device 605, a device 705, or a source network device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting detection of remote feature support). For example, the device 905 or a component of the device 905 may include a processor 940 and memory 930 coupled with or to the processor 940, the processor 940 and memory 930 configured to perform various functions described herein.

The communications manager 920 may support wireless communication at a source network device in accordance with examples as disclosed herein. For example, the communications manager 920 may be configured as or otherwise support a means for transmitting a first request from the source network device to a target network device via a core network. The communications manager 920 may be configured as or otherwise support a means for including, within a source-to-target transparent container information element of the first request, an indication of one or more information elements, the source-to-target transparent container information element configured for forwarding to the target network device. The communications manager 920 may be configured as or otherwise support a means for receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

By including or configuring the communications manager 920 in accordance with examples as described herein, the device 905 may support techniques for remote feature support detection, which may enable source and target network devices to communicate via source-to-target and target-to-source transparent containers forwarded by a core network, without interference from the core network. As such, the described techniques may reduce power consumption and improve resource efficiency at the source network device, improving overall communications between the source and target network devices, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of detection of remote feature support as described herein, or the processor 940 and the memory 930 may be otherwise configured to perform or support such operations.

Figure 10:
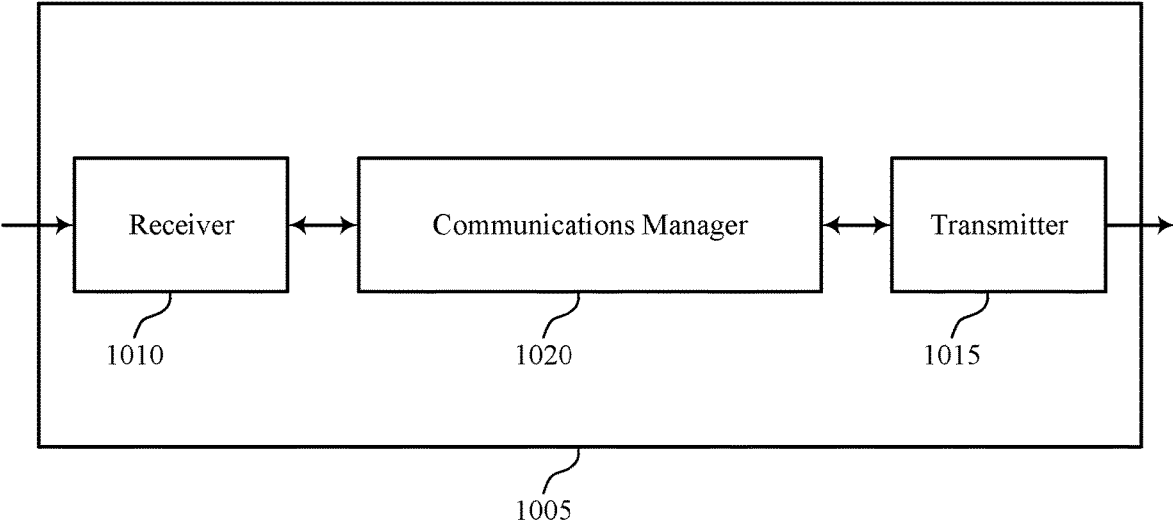
FIGS. 10 and 11 show block diagrams of devices that support detection of remote feature support in accordance with one or more aspects of the present disclosure.

FIG. 10 shows a block diagram 1000 of a device 1005 that supports detection of remote feature support in accordance with one or more aspects of the present disclosure. The device 1005 may be an example of aspects of a target network device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of detection of remote feature support as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a target network device in accordance with examples as disclosed herein. For example, the communications manager 1020 may be configured as or otherwise support a means for receiving a first request at the target network device from a source network device via a core network, the first request including a source-to-target transparent container information element that includes an indication of one or more information elements, the source-to-target transparent container information element configured for forwarding to the target network device. The communications manager 1020 may be configured as or otherwise support a means for generating a report, in response to the indication included in the source-to-target transparent container information element, that is indicative of whether individual information elements of the one or more information elements are present in the first request, as received at the target network device, or are supported by the target network device. The communications manager 1020 may be configured as or otherwise support a means for transmitting, to the source network device and via the core network, a first response to the first request. The communications manager 1020 may be configured as or otherwise support a means for including the report in a target-to-source transparent container information element of the first response.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for remote feature support detection, which may enable source and target network devices to communicate via source-to-target and target-to-source transparent containers forwarded by a core network, without interference from the core network. As such, the described techniques may reduce power consumption and improve resource efficiency at the source network device, improving overall communications between the source and target network devices, among other benefits.

Figure 11:
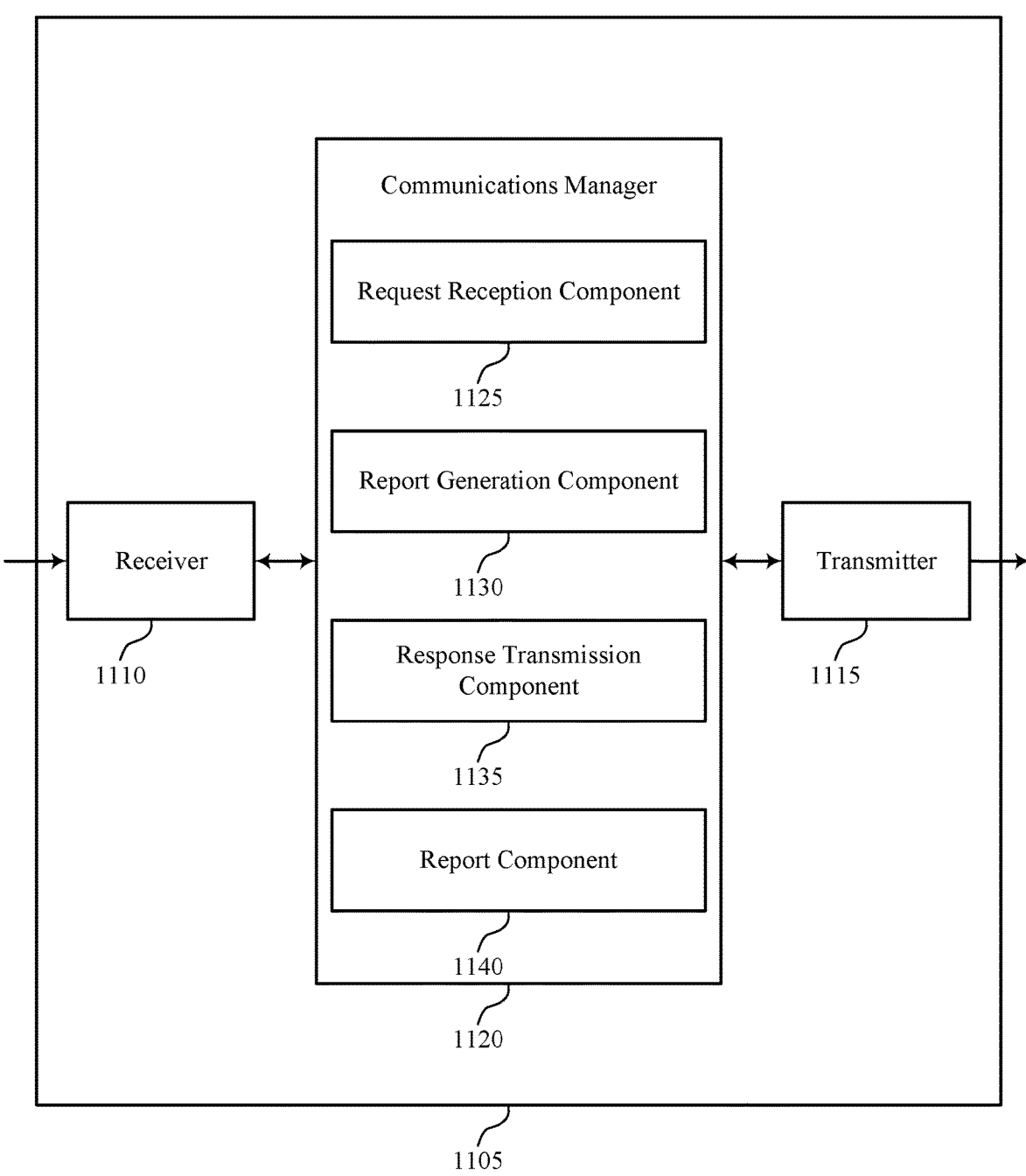

FIG. 11 shows a block diagram 1100 of a device 1105 that supports detection of remote feature support in accordance with one or more aspects of the present disclosure. The device 1105 may be an example of aspects of a device 1005 or a target network device as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of detection of remote feature support as described herein. For example, the communications manager 1120 may include a request reception component 1125, a report generation component 1130, a response transmission component 1135, a report component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a target network device in accordance with examples as disclosed herein. The request reception component 1125 may be configured as or otherwise support a means for receiving a first request at the target network device from a source network device via a core network, the first request including a source-to-target transparent container information element that includes an indication of one or more information elements, the source-to-target transparent container information element configured for forwarding to the target network device. The report generation component 1130 may be configured as or otherwise support a means for generating a report, in response to the indication included in the source-to-target transparent container information element, that is indicative of whether individual information elements of the one or more information elements are present in the first request, as received at the target network device, or are supported by the target network device. The response transmission component 1135 may be configured as or otherwise support a means for transmitting, to the source network device and via the core network, a first response to the first request. The report component 1140 may be configured as or otherwise support a means for including the report in a target-to-source transparent container information element of the first response.

Figure 12:
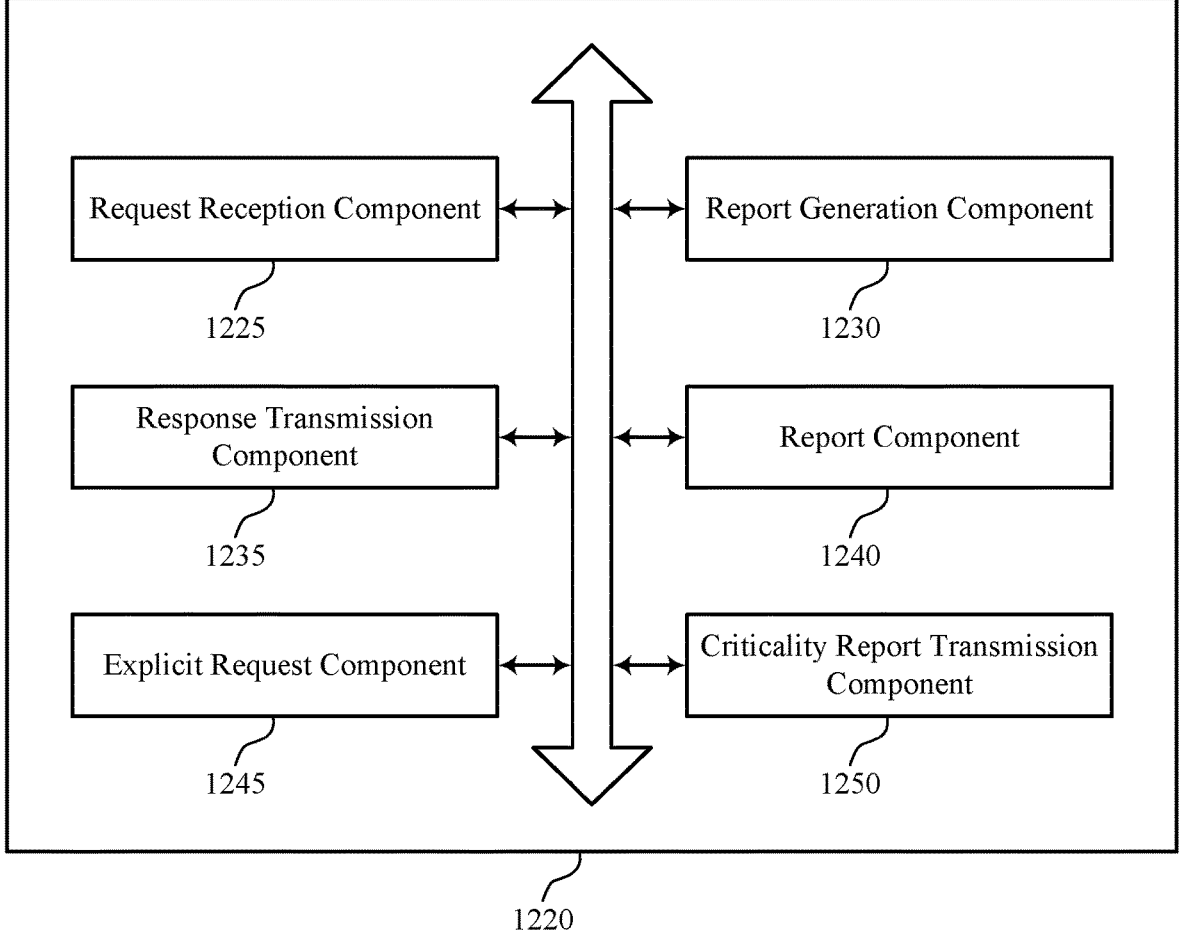
FIG. 12 shows a block diagram of a communications manager that supports detection of remote feature support in accordance with one or more aspects of the present disclosure.

FIG. 12 shows a block diagram 1200 of a communications manager 1220 that supports detection of remote feature support in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of detection of remote feature support as described herein. For example, the communications manager 1220 may include a request reception component 1225, a report generation component 1230, a response transmission component 1235, a report component 1240, an explicit request component 1245, a criticality report transmission component 1250, or any combination thereof. Each of these components may communicate, directly or indirectly, with one another (e.g., via one or more buses).

The communications manager 1220 may support wireless communication at a target network device in accordance with examples as disclosed herein. The request reception component 1225 may be configured as or otherwise support a means for receiving a first request at the target network device from a source network device via a core network, the first request including a source-to-target transparent container information element that includes an indication of one or more information elements, the source-to-target transparent container information element configured for forwarding to the target network device. The report generation component 1230 may be configured as or otherwise support a means for generating a report, in response to the indication included in the source-to-target transparent container information element, that is indicative of whether individual information elements of the one or more information elements are present in the first request, as received at the target network device, or are supported by the target network device. The response transmission component 1235 may be configured as or otherwise support a means for transmitting, to the source network device and via the core network, a first response to the first request. The report component 1240 may be configured as or otherwise support a means for including the report in a target-to-source transparent container information element of the first response.

In some examples, the first request is a handover required message transmitted by the source network device and translated into a handover request message, and where the one or more information elements are associated with the handover request message.

In some examples, the explicit request component 1245 may be configured as or otherwise support a means for receiving, within the source-to-target transparent container information element of the first request, an explicit request for the target network device to prepare the report to indicate presence diagnostic information for whether the first request includes individual information elements of the one or more information elements or whether the target network device supports the individual information elements.

In some examples, to support receiving the explicit request within the source-to-target transparent container information element, the explicit request component 1245 may be configured as or otherwise support a means for receiving, in the explicit request, a specific information element of the one or more information elements for which presence diagnostic information is requested, the specific information element indicated by a respective information element identifier or range of information element identifiers.

In some examples, the report includes an identification of each of the individual information elements, a respective presence of each of the individual information elements in the first request as received by the target network device, or a respective support by the target network device for each of the individual information elements.

In some examples, the criticality report transmission component 1250 may be configured as or otherwise support a means for transmitting a criticality report in the target-to-source transparent container information element, where the criticality report is responsive to receipt and failure of the first request by the target network device and is different from the report, which is responsive to receipt, by the target network device, of the indication within the source-to-target transparent container information element of the first request.

In some examples, the criticality report indicates one or more critical information elements that are unsupported by the target network device, the one or more critical information elements included in the criticality report based on a level of criticality of each of the one or more information elements. In some examples, the level of criticality for inclusion of the one or more critical information elements in the criticality report includes a reject level of criticality.

In some examples, to support receiving the first request, the request reception component 1225 may be configured as or otherwise support a means for receiving, in the first request, the one or more information elements via one or more criticality levels corresponding to the one or more information elements, where the report indicates the individual information elements and that correspond to the one or more criticality levels.

In some examples, the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

Figure 13:
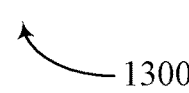
FIG. 13 shows a diagram of a system including a device that supports detection of remote feature support in accordance with one or more aspects of the present disclosure.

FIG. 13 shows a diagram of a system 1300 including a device 1305 that supports detection of remote feature support in accordance with one or more aspects of the present disclosure. The device 1305 may be an example of or include the components of a device 1005, a device 1105, or a target network device as described herein. The device 1305 may include components for bi-directional voice and data communications including components for transmitting and receiving communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting detection of remote feature support). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a target network device in accordance with examples as disclosed herein. For example, the communications manager 1320 may be configured as or otherwise support a means for receiving a first request at the target network device from a source network device via a core network, the first request including a source-to-target transparent container information element that includes an indication of one or more information elements, the source-to-target transparent container information element configured for forwarding to the target network device. The communications manager 1320 may be configured as or otherwise support a means for generating a report, in response to the indication included in the source-to-target transparent container information element, that is indicative of whether individual information elements of the one or more information elements are present in the first request, as received at the target network device, or are supported by the target network device. The communications manager 1320 may be configured as or otherwise support a means for transmitting, to the source network device and via the core network, a first response to the first request. The communications manager 1320 may be configured as or otherwise support a means for including the report in a target-to-source transparent container information element of the first response.

By including or configuring the communications manager 1320 in accordance with examples as described herein, the device 1305 may support techniques for remote feature support detection, which may enable source and target network devices to communicate via source-to-target and target-to-source transparent containers forwarded by a core network, without interference from the core network. As such, the described techniques may reduce power consumption and improve resource efficiency at the source network device, improving overall communications between the source and target network devices, among other benefits.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of detection of remote feature support as described herein, or the processor 1335 and the memory 1325 may be otherwise configured to perform or support such operations.

FIG. 14 shows a flowchart illustrating a method 1400 that supports detection of remote feature support in accordance with one or more aspects of the present disclosure. The operations of the method 1400 may be implemented by a source network device or its components as described herein. For example, the operations of the method 1400 may be performed by a source network device as described with reference to FIGS. 1 through 9. In some examples, a source network device may execute a set of instructions to control the functional elements of the source network device to perform the described functions. Additionally, or alternatively, the source network device may perform aspects of the described functions using special-purpose hardware.

At 1405, the method may include transmitting a first request from the source network device to a target network device via a core network. The operations of 1405 may be performed in accordance with examples as disclosed herein. In some examples, aspects of the operations of 1405 may be performed by a request transmission component 825 as described with reference to FIG. 8.

At 1410, the method may include including, within a source-to-target transparent container information element of the first request, an indication of one or more information elements, the source-to-target transparent container information element configured for forwarding to the target network device. The operations of 1410 may be performed in accordance with examples as disclosed herein. In some examples, aspects of the operations of 1410 may be performed by an information element component 830 as described with reference to FIG. 8.

At 1415, the method may include receiving, from the target network device and via the core network, in association with a first response to the first request and within a target-to-source transparent container information element of the first response, a report indicative of whether individual information elements of the one or more information elements are present in the first request, as received at the target network device, or are supported by the target network device. The operations of 1415 may be performed in accordance with examples as disclosed herein. In some examples, aspects of the operations of 1415 may be performed by a report reception component 835 as described with reference to FIG. 8.

FIG. 15 shows a flowchart illustrating a method 1500 that supports detection of remote feature support in accordance with one or more aspects of the present disclosure. The operations of the method 1500 may be implemented by a source network device or its components as described herein. For example, the operations of the method 1500 may be performed by a source network device as described with reference to FIGS. 1 through 9. In some examples, a source network device may execute a set of instructions to control the functional elements of the source network device to perform the described functions. Additionally, or alternatively, the source network device may perform aspects of the described functions using special-purpose hardware.

At 1505, the method may include transmitting a first request from the source network device to a target network device via a core network, the first request being a handover required message transmitted by the source network device and translated into a handover request message, and where the one or more information elements are associated with the handover request message. The operations of 1505 may be performed in accordance with examples as disclosed herein. In some examples, aspects of the operations of 1505 may be performed by a request transmission component 825 as described with reference to FIG. 8.

At 1510, the method may include including, within a source-to-target transparent container information element of the first request, an indication of the one or more information elements, the source-to-target transparent container information element configured for forwarding to the target network device. The operations of 1510 may be performed in accordance with examples as disclosed herein. In some examples, aspects of the operations of 1510 may be performed by an information element component 830 as described with reference to FIG. 8.

At 1515, the method may include receiving, from the target network device and via the core network, in association with a first response to the first request and within a target-to-source transparent container information element of the first response, a report indicative of whether individual information elements of the one or more information elements are present in the first request, as received at the target network device, or are supported by the target network device. The operations of 1515 may be performed in accordance with examples as disclosed herein. In some examples, aspects of the operations of 1515 may be performed by a report reception component 835 as described with reference to FIG. 8.

At 1520, the method may include identifying, from the report, that the handover request message includes the individual information elements. The operations of 1520 may be performed in accordance with examples as disclosed herein. In some examples, aspects of the operations of 1520 may be performed by a presence identification component 860 as described with reference to FIG. 8.

At 1525, the method may include identifying, from the report, that the handover request message does not include the individual information elements. The operations of 1525 may be performed in accordance with examples as disclosed herein. In some examples, aspects of the operations of 1525 may be performed by a presence identification component 860 as described with reference to FIG. 8.

At 1530, the method may include identifying, from the report, that the target network device supports the individual information elements. The operations of 1530 may be performed in accordance with examples as disclosed herein. In some examples, aspects of the operations of 1530 may be performed by a support identification component 840 as described with reference to FIG. 8.

At 1535, the method may include identifying, from the report, that the target network device does not support the individual information elements. The operations of 1535 may be performed in accordance with examples as disclosed herein. In some examples, aspects of the operations of 1535 may be performed by a support identification component 840 as described with reference to FIG. 8.

FIG. 16 shows a flowchart illustrating a method 1600 that supports detection of remote feature support in accordance with one or more aspects of the present disclosure. The operations of the method 1600 may be implemented by a source network device or its components as described herein. For example, the operations of the method 1600 may be performed by a source network device as described with reference to FIGS. 1 through 9. In some examples, a source network device may execute a set of instructions to control the functional elements of the source network device to perform the described functions. Additionally, or alternatively, the source network device may perform aspects of the described functions using special-purpose hardware.

At 1605, the method may include transmitting a first request from the source network device to a target network device via a core network. The operations of 1605 may be performed in accordance with examples as disclosed herein. In some examples, aspects of the operations of 1605 may be performed by a request transmission component 825 as described with reference to FIG. 8.

At 1610, the method may include including, within a source-to-target transparent container information element of the first request, an indication of one or more information elements, the source-to-target transparent container information element configured for forwarding to the target network device. The operations of 1610 may be performed in accordance with examples as disclosed herein. In some examples, aspects of the operations of 1610 may be performed by an information element component 830 as described with reference to FIG. 8.

At 1615, the method may include receiving, from the target network device and via the core network, in association with a first response to the first request and within a target-to-source transparent container information element of the first response, a report indicative of whether individual information elements of the one or more information elements are present in the first request, as received at the target network device, or are supported by the target network device. The operations of 1615 may be performed in accordance with examples as disclosed herein. In some examples, aspects of the operations of 1615 may be performed by a report reception component 835 as described with reference to FIG. 8.

At 1620, the method may include identifying, from the report, that the target network device supports the individual information elements. The operations of 1620 may be performed in accordance with examples as disclosed herein. In some examples, aspects of the operations of 1620 may be performed by a core network support component 845 as described with reference to FIG. 8.

At 1625, the method may include identifying, from the first response, that the target network device failed to perform the first request. The operations of 1625 may be performed in accordance with examples as disclosed herein. In some examples, aspects of the operations of 1625 may be performed by a core network support component 845 as described with reference to FIG. 8.

At 1630, the method may include concluding, based on the report and the first response, that at least one of the one or more functions of the core network does not support at least one of the individual information elements. The operations of 1630 may be performed in accordance with examples as disclosed herein. In some examples, aspects of the operations of 1630 may be performed by a core network support component 845 as described with reference to FIG. 8.

FIG. 17 shows a flowchart illustrating a method 1700 that supports detection of remote feature support in accordance with one or more aspects of the present disclosure. The operations of the method 1700 may be implemented by a target network device or its components as described herein. For example, the operations of the method 1700 may be performed by a target network device as described with reference to FIGS. 1 through 5 and 10 through 13. In some examples, a target network device may execute a set of instructions to control the functional elements of the target network device to perform the described functions. Additionally, or alternatively, the target network device may perform aspects of the described functions using special-purpose hardware.

At 1705, the method may include receiving a first request at the target network device from a source network device via a core network, the first request including a source-to-target transparent container information element that includes an indication of one or more information elements, the source-to-target transparent container information element configured for forwarding to the target network device. The operations of 1705 may be performed in accordance with examples as disclosed herein. In some examples, aspects of the operations of 1705 may be performed by a request reception component 1225 as described with reference to FIG. 12.

At 1710, the method may include generating a report, in response to the indication included in the source-to-target transparent container information element, that is indicative of whether individual information elements of the one or more information elements are present in the first request, as received at the target network device, or are supported by the target network device. The operations of 1710 may be performed in accordance with examples as disclosed herein. In some examples, aspects of the operations of 1710 may be performed by a report generation component 1230 as described with reference to FIG. 12.

At 1715, the method may include transmitting, to the source network device and via the core network, a first response to the first request. The operations of 1715 may be performed in accordance with examples as disclosed herein. In some examples, aspects of the operations of 1715 may be performed by a response transmission component 1235 as described with reference to FIG. 12.

At 1720, the method may include including the report in a target-to-source transparent container information element of the first response. The operations of 1720 may be performed in accordance with examples as disclosed herein. In some examples, aspects of the operations of 1720 may be performed by a report component 1240 as described with reference to FIG. 12.

FIG. 18 shows a flowchart illustrating a method 1800 that supports detection of remote feature support in accordance with one or more aspects of the present disclosure. The operations of the method 1800 may be implemented by a target network device or its components as described herein. For example, the operations of the method 1800 may be performed by a target network device as described with reference to FIGS. 1 through 5 and 10 through 13. In some examples, a target network device may execute a set of instructions to control the functional elements of the target network device to perform the described functions. Additionally, or alternatively, the target network device may perform aspects of the described functions using special-purpose hardware.

At 1805, the method may include receiving a first request at the target network device from a source network device via a core network, the first request including a source-to-target transparent container information element that includes an indication of one or more information elements, the source-to-target transparent container information element configured for forwarding to the target network device. The operations of 1805 may be performed in accordance with examples as disclosed herein. In some examples, aspects of the operations of 1805 may be performed by a request reception component 1225 as described with reference to FIG. 12.

At 1810, the method may include receiving, within the source-to-target transparent container information element of the first request, an explicit request for the target network device to prepare the report to indicate presence diagnostic information for whether the first request includes individual information elements of the one or more information elements or whether the target network device supports the individual information elements. The operations of 1810 may be performed in accordance with examples as disclosed herein. In some examples, aspects of the operations of 1810 may be performed by an explicit request component 1245 as described with reference to FIG. 12.

At 1815, the method may include generating a report, in response to the indication included in the source-to-target transparent container information element, that includes an identification of each of the individual information elements, a respective presence of each of the individual information elements in the first request as received by the target network device, or a respective support by the target network device for each of the individual information elements. The operations of 1815 may be performed in accordance with examples as disclosed herein. In some examples, aspects of the operations of 1815 may be performed by a report generation component 1230 as described with reference to FIG. 12.

At 1820, the method may include transmitting, to the source network device and via the core network, a first response to the first request. The operations of 1820 may be performed in accordance with examples as disclosed herein. In some examples, aspects of the operations of 1820 may be performed by a response transmission component 1235 as described with reference to FIG. 12.

At 1825, the method may include including the report in a target-to-source transparent container information element of the first response. The operations of 1825 may be performed in accordance with examples as disclosed herein. In some examples, aspects of the operations of 1825 may be performed by a report component 1240 as described with reference to FIG. 12.

FIG. 19 shows a flowchart illustrating a method 1900 that supports detection of remote feature support in accordance with one or more aspects of the present disclosure. The operations of the method 1900 may be implemented by a target network device or its components as described herein. For example, the operations of the method 1900 may be performed by a target network device as described with reference to FIGS. 1 through 5 and 10 through 13. In some examples, a target network device may execute a set of instructions to control the functional elements of the target network device to perform the described functions. Additionally, or alternatively, the target network device may perform aspects of the described functions using special-purpose hardware.

At 1905, the method may include receiving a first request at the target network device from a source network device via a core network, the first request including a source-to-target transparent container information element that includes an indication of one or more information elements, the source-to-target transparent container information element configured for forwarding to the target network device. The operations of 1905 may be performed in accordance with examples as disclosed herein. In some examples, aspects of the operations of 1905 may be performed by a request reception component 1225 as described with reference to FIG. 12.

At 1910, the method may include generating a report, in response to the indication included in the source-to-target transparent container information element, that is indicative of whether individual information elements of the one or more information elements are present in the first request, as received at the target network device, or are supported by the target network device. The operations of 1910 may be performed in accordance with examples as disclosed herein. In some examples, aspects of the operations of 1910 may be performed by a report generation component 1230 as described with reference to FIG. 12.

At 1915, the method may include transmitting, to the source network device and via the core network, a first response to the first request. The operations of 1915 may be performed in accordance with examples as disclosed herein. In some examples, aspects of the operations of 1915 may be performed by a response transmission component 1235 as described with reference to FIG. 12.

At 1920, the method may include including the report in a target-to-source transparent container information element of the first response. The operations of 1920 may be performed in accordance with examples as disclosed herein. In some examples, aspects of the operations of 1920 may be performed by a report component 1240 as described with reference to FIG. 12.

At 1925, the method may include transmitting a criticality report in the target-to-source transparent container information element, where the criticality report is responsive to receipt and failure of the first request by the target network device and is different from the report, which is responsive to receipt, by the target network device, of the indication within the source-to-target transparent container information element of the first request. The operations of 1925 may be performed in accordance with examples as disclosed herein. In some examples, aspects of the operations of 1925 may be performed by a criticality report transmission component 1250 as described with reference to FIG. 12.

The following provides an overview of aspects of the present disclosure:

Aspect 1: A method for wireless communication at a source network device, comprising: transmitting a first request from the source network device to a target network device via a core network; including, within a source-to-target transparent container information element of the first request, an indication of one or more information elements, the source-to-target transparent container information element configured for forwarding to the target network device; and receiving, from the target network device and via the core network, in association with a first response to the first request and within a target-to-source transparent container information element of the first response, a report indicative of whether individual information elements of the one or more information elements are present in the first request, as received at the target network device, or are supported by the target network device.

Aspect 2: The method of aspect 1, wherein the first request is a handover required message transmitted by the source network device and translated into a handover request message, and wherein the one or more information elements are associated with the handover request message.

Aspect 3: The method of aspect 2, further comprising: identifying, from the report, that the handover request message includes the individual information elements.

Aspect 4: The method of any of aspects 2 through 3, further comprising: identifying, from the report, that the handover request message does not include the individual information elements.

Aspect 5: The method of any of aspects 1 through 4, further comprising: identifying, from the report, that the target network device supports the individual information elements.

Aspect 6: The method of any of aspects 1 through 5, further comprising: identifying, from the report, that the target network device does not support the individual information elements.

Aspect 7: The method of any of aspects 1 through 6, further comprising: identifying, from a combination of the report and the first response, whether the one or more functions of the core network support the individual information elements.

Aspect 8: The method of aspect 7, wherein identifying whether the one or more functions of the core network support the individual information elements further comprises: identifying, from the report, that the target network device supports the individual information elements; identifying, from the first response, that the target network device failed to perform the first request; and concluding, based on the report and the first response, that at least one of the one or more functions of the core network does not support at least one of the individual information elements.

Aspect 9: The method of any of aspects 1 through 8, further comprising: including, within the source-to-target transparent container information element of the first request, an explicit request for the target network device to prepare the report to indicate presence diagnostic information for whether the first request includes individual information elements of the one or more information elements or whether the target network device supports the individual information elements.

Aspect 10: The method of aspect 9, wherein including the explicit request within the source-to-target transparent container information element further comprises: identifying, in the explicit request, a specific information element of the one or more information elements for which presence diagnostic information is requested, the specific information element indicated by a respective information element identifier or range of information element identifiers.

Aspect 11: The method of any of aspects 1 through 10, wherein the report includes an identification of each of the individual information elements, a respective presence of each of the individual information elements in the first request as received by the target network device, or a respective support by the target network device for each of the individual information elements.

Aspect 12: The method of any of aspects 1 through 11, further comprising: receiving a criticality report in the target-to-source transparent container information element, wherein the criticality report is responsive to receipt and failure of the first request by the target network device and is different from the report, which is responsive to receipt, by the target network device, of the indication within the source-to-target transparent container information element of the first request.

Aspect 13: The method of aspect 12, wherein the criticality report indicates one or more critical information elements that are unsupported by the target network device, the one or more critical information elements included in the criticality report based at least in part on a level of criticality of each of the one or more information elements.

Aspect 14: The method of aspect 13, wherein the level of criticality for inclusion of the one or more critical information elements in the criticality report includes a reject level of criticality.

Aspect 15: The method of any of aspects 1 through 14, wherein including the indication of the one or more information elements within the source-to-target transparent container information element of the first request further comprises: indicating the one or more information elements via one or more criticality levels corresponding to the one or more information elements, wherein the report indicates the individual information elements and that correspond to the one or more criticality levels.

Aspect 16: The method of aspect 15, wherein the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

Aspect 17: A method for wireless communication at a target network device, comprising: receiving a first request at the target network device from a source network device via a core network, the first request including a source-to-target transparent container information element that includes an indication of one or more information elements, the source-to-target transparent container information element configured for forwarding to the target network device; generating a report, in response to the indication included in the source-to-target transparent container information element, that is indicative of whether individual information elements of the one or more information elements are present in the first request, as received at the target network device, or are supported by the target network device; transmitting, to the source network device and via the core network, a first response to the first request; and including the report in a target-to-source transparent container information element of the first response.

Aspect 18: The method of aspect 17, wherein the first request is a handover required message transmitted by the source network device and translated into a handover request message, and wherein the one or more information elements are associated with the handover request message.

Aspect 19: The method of any of aspects 17 through 18, further comprising: receiving, within the source-to-target transparent container information element of the first request, an explicit request for the target network device to prepare the report to indicate presence diagnostic information for whether the first request includes individual information elements of the one or more information elements or whether the target network device supports the individual information elements.

Aspect 20: The method of aspect 19, wherein receiving the explicit request within the source-to-target transparent container information element further comprises: receiving, in the explicit request, a specific information element of the one or more information elements for which presence diagnostic information is requested, the specific information element indicated by a respective information element identifier or range of information element identifiers.

Aspect 21: The method of any of aspects 17 through 20, wherein the report includes an identification of each of the individual information elements, a respective presence of each of the individual information elements in the first request as received by the target network device, or a respective support by the target network device for each of the individual information elements.

Aspect 22: The method of any of aspects 17 through 21, further comprising: transmitting a criticality report in the target-to-source transparent container information element, wherein the criticality report is responsive to receipt and failure of the first request by the target network device and is different from the report, which is responsive to receipt, by the target network device, of the indication within the source-to-target transparent container information element of the first request.

Aspect 23: The method of aspect 22, wherein the criticality report indicates one or more critical information elements that are unsupported by the target network device, the one or more critical information elements included in the criticality report based at least in part on a level of criticality of each of the one or more information elements.

Aspect 24: The method of aspect 23, wherein the level of criticality for inclusion of the one or more critical information elements in the criticality report includes a reject level of criticality.

Aspect 25: The method of any of aspects 17 through 24, wherein receiving the first request further comprises: receiving, in the first request, the one or more information elements via one or more criticality levels corresponding to the one or more information elements, wherein the report indicates the individual information elements and that correspond to the one or more criticality levels.

Aspect 26: The method of aspect 25, wherein the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

Aspect 27: An apparatus for wireless communication at a source network device, comprising a processor; memory coupled with the processor; and instructions stored in the memory and executable by the processor to cause the apparatus to perform a method of any of aspects 1 through 16.

Aspect 28: An apparatus for wireless communication at a source network device, comprising at least one means for performing a method of any of aspects 1 through 16.

Aspect 29: A non-transitory computer-readable medium storing code for wireless communication at a source network device, the code comprising instructions executable by a processor to perform a method of any of aspects 1 through 16.

Aspect 30: An apparatus for wireless communication at a target network device, comprising a processor; memory coupled with the processor; and instructions stored in the memory and executable by the processor to cause the apparatus to perform a method of any of aspects 17 through 26.

Aspect 31: An apparatus for wireless communication at a target network device, comprising at least one means for performing a method of any of aspects 17 through 26.

Aspect 32: A non-transitory computer-readable medium storing code for wireless communication at a target network device, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a source network device, comprising:
a processor;
memory coupled with the processor; and
instructions stored in the memory and executable by the processor to cause the apparatus to:
transmit a first request from the source network device to a target network device via a core network;
include, within a source-to-target transparent container information element of the first request, an indication of one or more information elements, the source-to-target transparent container information element configured for forwarding to the target network device; and
receive, from the target network device and via the core network, a report indicative of whether individual information elements of the one or more information elements are present in the first request, as received at the target network device, and whether individual information elements of the one or more information elements are supported by the target network device, the report being within a target-to-source transparent container information element of a first response that is associated with and responsive to the first request.

2. The apparatus of claim 1, wherein the first request is a handover required message transmitted by the source network device and translated into a handover request message, and wherein the one or more information elements are associated with the handover request message.

3. The apparatus of claim 2, wherein the instructions are further executable by the processor to cause the apparatus to:
identify, from the report, that the handover request message includes the individual information elements.

4. The apparatus of claim 2, wherein the instructions are further executable by the processor to cause the apparatus to:
identify, from the report, that the handover request message does not include the individual information elements.

5. The apparatus of claim 1, wherein the instructions are further executable by the processor to cause the apparatus to:
identify, from the report, that the target network device supports the individual information elements.

6. The apparatus of claim 1, wherein the instructions are further executable by the processor to cause the apparatus to:
identify, from the report, that the target network device does not support the individual information elements.

7. The apparatus of claim 1, wherein the instructions are further executable by the processor to cause the apparatus to:
identify, from a combination of the report and the first response, whether one or more functions of the core network support the individual information elements.

8. The apparatus of claim 7, wherein the instructions to identify whether the one or more functions of the core network support the individual information elements are further executable by the processor to cause the apparatus to:

identify, from the report, that the target network device supports the individual information elements;

identify, from the first response, that the target network device failed to perform the first request; and conclude, based on the report and the first response, that at least one of the one or more functions of the core network does not support at least one of the individual information elements.

9. The apparatus of claim 1, wherein the instructions are further executable by the processor to cause the apparatus to:

include, within the source-to-target transparent container information element of the first request, an explicit request for the target network device to prepare the report to indicate presence diagnostic information for whether the first request includes the individual information elements of the one or more information elements or whether the target network device supports the individual information elements.

10. The apparatus of claim 9, wherein the instructions to include the explicit request within the source-to-target transparent container information element are further executable by the processor to cause the apparatus to:

identify, in the explicit request, a specific information element of the one or more information elements for which presence diagnostic information is requested, the specific information element indicated by a respective information element identifier or range of information element identifiers.

11. The apparatus of claim 1, wherein the report includes an identification of each of the individual information elements, a respective presence of each of the individual information elements in the first request as received by the target network device, and a respective support by the target network device for each of the individual information elements.

12. The apparatus of claim 1, wherein the instructions are further executable by the processor to cause the apparatus to:

receive, within the target-to-source transparent container information element, a criticality report that is responsive to receipt and failure of the first request by the target network device and is different from the report, which is responsive to receipt, by the target network device, of the indication within the source-to-target transparent container information element of the first request.

13. The apparatus of claim 12, wherein the criticality report indicates one or more critical information elements that are unsupported by the target network device, the one or more critical information elements included in the criticality report based at least in part on a level of criticality of each of the one or more information elements.

14. The apparatus of claim 13, wherein the level of criticality for inclusion of the one or more critical information elements in the criticality report includes a reject level of criticality.

15. The apparatus of claim 1, wherein the instructions to include the indication of the one or more information elements within the source-to-target transparent container information element of the first request are further executable by the processor to cause the apparatus to:

indicate the one or more information elements via one or more criticality levels corresponding to the one or more information elements, wherein the report indicates the individual information elements and that correspond to the one or more criticality levels.

16. The apparatus of claim 15, wherein the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

17. An apparatus for wireless communication at a target network device, comprising:

a processor, memory coupled with the processor; and instructions stored in the memory and executable by the processor to cause the apparatus to:

receive a first request at the target network device from a source network device via a core network, the first request including a source-to-target transparent container information element that includes an indication of one or more information elements, the source-to-target transparent container information element configured for forwarding to the target network device;

generate a report, in response to the indication included in the source-to-target transparent container information element, that is indicative of whether individual information elements of the one or more information elements are present in the first request, as received at the target network device, and are supported by the target network device; and transmit, to the source network device and via the core network, the report within a target-to-source transparent container information element of a first response to the first request.

18. The apparatus of claim 17, wherein the first request is a handover required message transmitted by the source network device and translated into a handover request message, and wherein the one or more information elements are associated with the handover request message.

19. The apparatus of claim 17, wherein the instructions are further executable by the processor to cause the apparatus to:

receive, within the source-to-target transparent container information element of the first request, an explicit request for the target network device to prepare the report to indicate presence diagnostic information for whether the first request includes the individual information elements of the one or more information elements or whether the target network device supports the individual information elements.

20. The apparatus of claim 19, wherein the instructions to receive the explicit request within the source-to-target transparent container information element are further executable by the processor to cause the apparatus to:

receive, in the explicit request, a specific information element of the one or more information elements for which presence diagnostic information is requested, the specific information element indicated by a respective information element identifier or range of information element identifiers.

21. The apparatus of claim 17, wherein the report includes an identification of each of the individual information elements, a respective presence of each of the individual information elements in the first request as received by the target network device, and a respective support by the target network device for each of the individual information elements.

22. The apparatus of claim 17, wherein the instructions are further executable by the processor to cause the apparatus to:

transmit a criticality report in the target-to-source transparent container information element, wherein the criticality report is responsive to receipt and failure of the first request by the target network device and is different from the report, which is responsive to receipt, by the target network device, of the indication within the source-to-target transparent container information element of the first request.

23. The apparatus of claim 22, wherein the criticality report indicates one or more critical information elements that are unsupported by the target network device, the one or more critical information elements included in the criticality report based at least in part on a level of criticality of each of the one or more information elements.

24. The apparatus of claim 23, wherein the level of criticality for inclusion of the one or more critical information elements in the criticality report includes a reject level of criticality.

25. The apparatus of claim 17, wherein the instructions to receive the first request are further executable by the processor to cause the apparatus to:

receive, in the first request, the one or more information elements via one or more criticality levels corresponding to the one or more information elements, wherein the report indicates the individual information elements and that correspond to the one or more criticality levels.

26. The apparatus of claim 25, wherein the one or more criticality levels include a first level that corresponds to a criticality diagnostics report and is indicative of whether the criticality diagnostics report is to be provided to the source network device, a second level that corresponds to a reject criticality and is indicative that the report is to indicate information elements having the reject criticality in the first request or support for the information elements having the reject criticality, and a third level that corresponds to an ignore criticality and is indicative that the report is to indicate support by the target network device for information elements having the ignore criticality.

27. A method for wireless communication at a source network device, comprising:

transmitting a first request from the source network device to a target network device via a core network;

including, within a source-to-target transparent container information element of the first request, an indication of one or more information elements, the source-to-target transparent container information element configured for forwarding to the target network device; and receiving, from the target network device and via the core network, a report indicative of whether individual information elements of the one or more information elements are present in the first request, as received at the target network device, and whether individual information elements of the one or more information elements are supported by the target network device, the report being within a target-to-source transparent container information element of a first response that is associated with and responsive to the first request.

28. The method of claim 27, wherein the first request is a handover required message transmitted by the source network device and translated into a handover request message, and wherein the one or more information elements are associated with the handover request message.

29. A method for wireless communication at a target network device, comprising:

receiving a first request at the target network device from a source network device via a core network, the first request including a source-to-target transparent container information element that includes an indication of one or more information elements, the source-to-target transparent container information element configured for forwarding to the target network device;

generating a report, in response to the indication included in the source-to-target transparent container information element, that is indicative of whether individual information elements of the one or more information elements are present in the first request, as received at the target network device, and are supported by the target network device; and transmitting, to the source network device and via the core network, the report within a target-to-source transparent container information element of a first response to the first request.

30. The method of claim 29, wherein the first request is a handover required message transmitted by the source network device and translated into a handover request message, and wherein the one or more information elements are associated with the handover request message.

* * * * *